United States Patent
Boisen et al.

(10) Patent No.: US 12,220,703 B2
(45) Date of Patent: Feb. 11, 2025

(54) MULTI FUNCTION SPINNING PLATFORM

(71) Applicant: Danmarks Tekniske Universitet, Kgs. Lyngby (DK)

(72) Inventors: Anja Boisen, Birkerød (DK); En-Te Hwu, Kgs. Lyngby (DK); Kinga Iudith Zor, Lund (SE); Sriram Thoppe Ranjendran, Holte (DK); Laura Serioli, Frederiksberg (DK)

(73) Assignee: Danmarks Tekniske Universitet, Kongens Lyngby (DK)

( * ) Notice: Subject to any disclaimer, the term of this patent is extended or adjusted under 35 U.S.C. 154(b) by 561 days.

(21) Appl. No.: 17/555,691

(22) Filed: Dec. 20, 2021

(65) Prior Publication Data

US 2022/0111384 A1    Apr. 14, 2022

Related U.S. Application Data

(63) Continuation of application No. 17/288,152, filed as application No. PCT/EP2019/079115 on Oct. 24, 2019.

(30) Foreign Application Priority Data

Oct. 24, 2018 (EP) .................................. 18202261

(51) Int. Cl.
*B01L 3/00* (2006.01)
*B04B 5/12* (2006.01)
(Continued)

(52) U.S. Cl.
CPC .......... *B01L 3/502753* (2013.01); *B04B 5/12* (2013.01); *G01N 21/65* (2013.01);
(Continued)

(58) Field of Classification Search
None
See application file for complete search history.

(56) References Cited

U.S. PATENT DOCUMENTS

2002/0106786 A1* 8/2002 Carvalho ............ B01L 3/50273
435/288.5
2005/0069913 A1    3/2005 Mian et al.
(Continued)

FOREIGN PATENT DOCUMENTS

EP    3206012 A1    8/2017
WO    9955827 A1    11/1999
(Continued)

OTHER PUBLICATIONS

Severini Giaele; Luglio 2018; 95 pages; Centrifugal microfluidic platform for optical monitoring of bacterial biofilms.
(Continued)

*Primary Examiner* — J. Christopher Ball
(74) *Attorney, Agent, or Firm* — Dinsmore & Shohl LLP

(57) ABSTRACT

A rotatable platform is provided for use in Lab-on-disc (LoD) applications. A LoD microfluidic device has the rotatable platform and is suitable for analysis of a fluid sample. Real-time monitoring of cells is also provided, using a centrifugal microfluidic platform. A mobile LoD device is provided, which can be used in remote destinations and for point of care applications. A method for monitoring microorganisms under the constant supply of nutrients includes the step of inoculating the cells in a culture chamber in a rotatable microfluidic platform, rotating the platform such that liquid in a reservoir connected to or located on the platform, the liquid comprising nutrients for the cells, is constantly supplied to the cells in the culture chamber by means of shear/centrifugal force resulting from rotating the platform, and continuously monitoring the cells during
(Continued)

rotation of the platform by means of imaging, electrochemical and/or electrical measurements.

20 Claims, 25 Drawing Sheets

(51) Int. Cl.
    *G01N 21/65*     (2006.01)
    *G01N 27/27*     (2006.01)
    *G01N 27/327*     (2006.01)

(52) U.S. Cl.
    CPC .......... *G01N 27/27* (2013.01); *G01N 27/327* (2013.01); *B01L 2200/027* (2013.01); *B01L 2200/0642* (2013.01); *B01L 2200/10* (2013.01); *B01L 2200/18* (2013.01); *B01L 2300/023* (2013.01); *B01L 2300/0645* (2013.01); *B01L 2300/0654* (2013.01); *B01L 2300/0663* (2013.01); *B01L 2300/0803* (2013.01); *B01L 2300/12* (2013.01); *B01L 2400/0409* (2013.01)

(56) References Cited

U.S. PATENT DOCUMENTS

| | | | |
|---|---|---|---|
| 2005/0287536 A1 | 12/2005 | Kozlay | |
| 2009/0317896 A1 | 12/2009 | Yoo | |
| 2010/0105577 A1 | 4/2010 | Dugan et al. | |
| 2014/0134631 A1* | 5/2014 | Clime | G01N 35/00009 435/6.12 |

FOREIGN PATENT DOCUMENTS

| | | |
|---|---|---|
| WO | 2006060822 A2 | 6/2006 |
| WO | 2010104292 A2 | 9/2010 |
| WO | 2017070607 A1 | 4/2017 |

OTHER PUBLICATIONS

Park et al, To cite this article: Jiheum Park et al 2017 Biofabrication g 045006, 13 pages, Hypergravity-induced multicellular spheroid generation with different morphological patterns precisely controlled on a centrifugal microfluidic platform.
Tae-Hyeong Kim et al, Lab Chip, 2013, 13, 3747, Flow-enhanced electrochemical immunosensors on centrifugal microfluidic platforms; 8 pages.
Burger et al.: "Centrifugal microfluidics for cell analysis", www.sciencedirect.com, https://doi.org/10.1016/j.cbpa.2012.06.002, Jul. 9, 2012.
Edwards, Georgina, A simple, bubble-free cell loading technique for culturing mammalian cells on lab-on-a-chip devices, Faculty of Engineering and Natural Sciences, Sabanci University, 34956, Istanbul, Turkey, Available online https://research.sabanciuniv.edu/id/eprint/31149; 2 pages; dated Feb. 28, 2017.
Burger et al.: "Detection methods for centrifugal microfluidic platforms", Biosensors and Bioelectronics 76 (2016) 54-67.
Cheng et al.: "Wireless, smartphone controlled potentiostat integrated with lab-on-disc platform", orbit.dtu.dk, Mar. 13, 2018.
Nyholm: "Electrochemical techniques for lab-on-a-chip applications", Analyst, vol. 130 (2005), pp. 599-605.
Xiao et al.: "Wireless Charging Technologies: Fundamentals, Standards, and Network Applications", IEEE Communications Surveys and Tutorials, pp. 1413-1452, Nov. 14, 2015.
Xu et al.: "Integration of electrochemistry in micro-total analysis systems for biochemical assays: Recent developments", Talanta 80 (2009) 8-18.

* cited by examiner

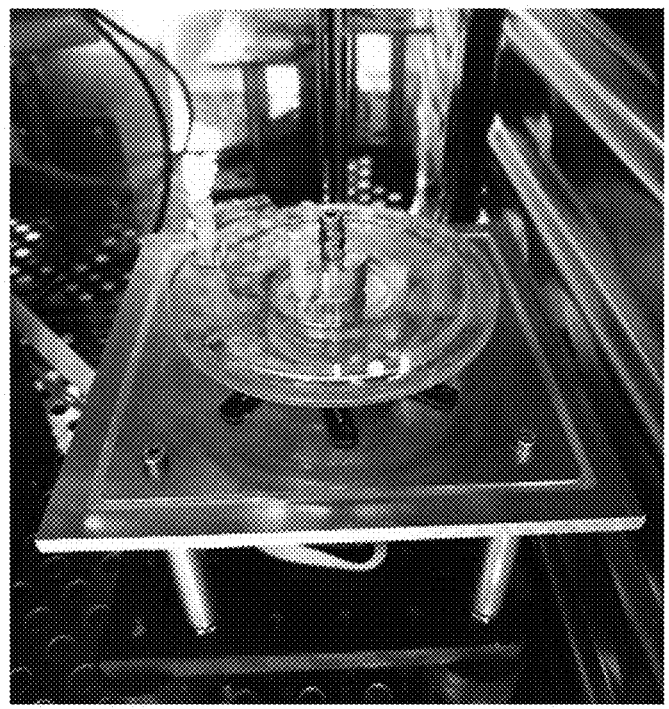
Fig. 42a
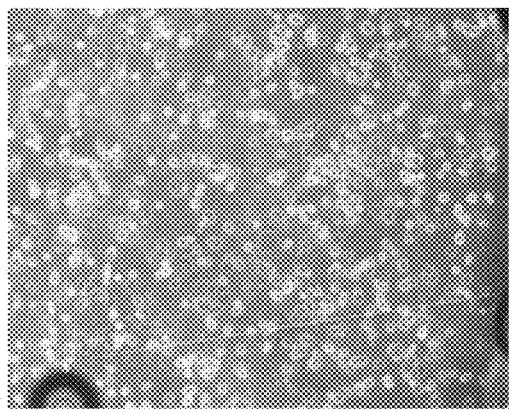 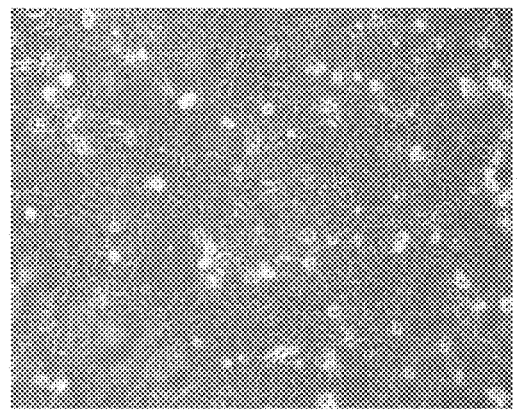
Fig. 42b                    Fig. 42c

MULTI FUNCTION SPINNING PLATFORM

CROSS REFERENCE TO RELATED APPLICATIONS

This application is a continuation of U.S. application Ser. No. 17/288,152, filed Apr. 23, 2021, which is the U.S. National Stage of PCT/EP2019/079115, filed Oct. 24, 2019, which claims priority to European Patent Application No. 18202261.6, filed Oct. 24, 2018, the entire contents of each of which are incorporated herein by reference in their entirety.

FIELD OF THE INVENTION

The present disclosure relates to rotatable platform for use in Lab-on-disc (LoD) applications, and LoD microfluidic device having the rotatable platform and which is suitable for analysis of a fluid sample. The present disclosure further relates to real-time monitoring of cells using a centrifugal microfluidic platform. In particular, the present disclosure relates to a mobile LoD device, which can be used in remote destinations and for point of care applications.sd

BACKGROUND OF INVENTION

Lab on disc (LoD) techniques has existed for decades. The basic principle is a scaled-down system for studying centrifugal phenomena. LoD is beneficial for separation of a small amount of sample, mixing, sensing, waste handling and so forth. This means that LoD is extremely useful in the fields of bio-assay sample handling and disease diagnostics. The LoD miniaturize the entire lab process into a disc and is widely used in advanced society but also for under-resourced areas. However the LoD has its limitations, one of them being that it is hard to implement active, real-time sensing and detection while spinning.

Integration of electrochemical detection with microfluidics has several advantages [1], since both the electrode and the instrumentation can be miniaturized, multiplexed and automated without losing performance [1][2]. Lab-on-disc (LoD) platforms have gained significant interest in both academic research and industry [3]. They offer an alternative to traditional pressure driven microfluidic systems requiring minimal instrumentation for liquid handling, thereby enabling the development of simple portable and compact detection systems.

A conventional spinning LoD system is typically driven by an external spindle motor which are both bulky and difficult to control. Also the traditional strobe photography setup for imaging microfluidic channels in the disc, while the disc is spinning, is bulky and requires a dedicated setup. Such a setup may comprise a charge-coupled device (CCD) or a complementary metal-oxide-semiconductor (CMOS) camera, a lens system and an illumination light source.

One purpose of the LoD is to replace bulky experimental setups which also require extensive manual handling. One example is the optical analysis in traditional antibiotic resistance evaluation, for determination of the minimum inhibitory concentration (MIC) for antibiotics, using solid agar plates. This analysis requires days and trained personal to conduct and evaluate the results with an optical microscope. Another example is when performing cell (mammalian) toxicity assay in drug development and testing. These experiment are commonly performed in static, using multi-well plates and optical readout (optical microscope, spectrophotometer) and also need trained personal for carrying out the analysis.

An additional purpose of the multifunctional LoD is to replace bulky electrochemical detection systems (e.g. potentiostat) commonly used in combination with LoD platforms. One practical application of this multifunctional platform with integrated potentiostat is the electrochemical monitoring of the effect of antibiotics on bacteria in real-time.

Traditionally in clinical settings, bacteria are grown and their antimicrobial resistance is evaluated in vitro, using petri dishes, test tubes and well plates in combination with disc diffusion studies, E-test and broth dilution which are utilized to evaluate the MIC. These methods have defined protocols and standard procedures, but they do not mimic the real bacterial natural growth environment since the bacteria grows in static or in best condition on shaking plates. Moreover, in these assays it is difficult to achieve biofilm formation and in addition they require several steps and sample handling increasing the possibilities to introduce error, invalidating the final result and decreasing the throughput. On the contrary, perfusion culture have proved to be ideal for studying biofilms in vitro. In flow systems, fresh media is continuously perfused mimicking more elements from in vivo conditions such as oxygen, nutrients and varying the nutrient flow. It is important to be noted that bacterial biofilms have increased resistance to most of the antimicrobial treatments and reportedly over 80% of infections are caused by biofilms. Therefore, it is highly relevant to evaluate antibiotic resistance when bacteria are grown in biofilms.

A large number of perfusion systems have been created over the last years for growing and studying bacteria. Commonly, liquid is moved using a syringe pump or a peristaltic pump while bacteria inoculation and growth occur in flow. Detection is performed with confocal scanning laser microscopy or electrochemistry. These systems are considered a bridge between in vivo and in vitro testing but still present some disadvantages. Most of the fluidic systems require bulky and expensive pumps, tubes and actuators, which involve a large consumption of liquid and sample together with the need for trained personnel to operate the platform. Furthermore, they often introduce bubbles in the flow chip damaging the culture.

Centrifugal microfluidic or lab-on-a-disc (LoD) systems provide a good alternative to conventional fluidic platforms, since they are compact, low cost, can be portable and they use small reagents volumes (from microliter to few milliliter). In LoD systems, the liquid flow is controlled by centrifugal forces, enabled by a small spinning rotor for the fluidic actuation. By avoiding the usage of pumps, it is possible to decrease the introduction of bubbles in the system. Additionally, there are various approaches to implement multiple operational units such as filtration, metering, mixing and valving, enabling to perform a complete biological assay. Considering the advantages of the LoD systems, they have been used for a wide range of applications including diagnostic, food analysis, sample pretreatment and cell handling. However, there are no a lab-on-a-disc system that can facilitate long-term cultivation of bacteria or mammalian cells.

SUMMARY OF INVENTION

The present disclosure relates to a mobile/portable centrifugal microfluidic device suitable for optical, electrochemical and other kinds of analysis of a fluid sample as well as for in vivo assays (e.g. long term culture of bacteria and mammalian cells) in perfusion. The device may comprise a supporting base for supporting the device on a surface and a rotational platform on top of the base configured to rotate with respect to an axis perpendicular to the base. The device further comprises at least one sample chamber for holding a fluid sample. Such a sample chamber may be located on the rotatable platform and configured to rotate with the rotatable platform such that the fluid sample is centrifuged during rotation of the rotatable platform. Alternatively, the sample chamber may be located in a separate lab-on-a-disc, which is placed on top of the rotatable platform. In addition, the device may comprise at least one wireless power transmitter for powering electronics on the rotatable platform.

The inventors have realized that there are significant advantages if the element(s) that produces the mechanical energy necessary for rotating the platform is/are actually part of the rotatable platform in itself, e.g. integrated on the platform. This can be one or more machines suitable for transforming one kind of energy into mechanical energy, e.g. one of more electrical motors that can convert electrical energy into mechanical energy that can be used for rotating the platform. By for example using a wireless power (WP) transmitter, power to the electrical motor(s) can be transferred wirelessly and the motor can then function as the source of mechanical energy for rotating the platform. Any electronics on the platform, e.g. (wireless) transmitter, a speed sensor, an actuator, a microcontroller and a power regulator can be powered by the wirelessly transferred power or by the motor.

The present disclosure further relates to a mobile microfluidic system comprising the portable centrifugal microfluidic device and a software application executable on a remote device and configured for wirelessly communicating with the mobile centrifugal microfluidic device.

The present disclosure further relates to a centrifugal microfluidic platform suitable for in vitro studies of microorganisms or cells, wherein said studies resemble more realistic in vivo conditions. A centrifugal microfluidic disc, for in vitro perfusion culture, is preferably a main part of the multi-functional modular platform. The presently disclosed centrifugal microfluidic disc may be seen as a platform in itself, and may be referred to as such herein, but the disc may also be seen as part a modular platform. The centrifugal microfluidic disc preferably comprises an inlet reservoir; at least one inlet channel; at least one sample chamber for in vitro studies of microorganisms; at least one effluent channel; and an outlet reservoir. The microfluidic disc is advantageously configured for engaging with a rotatable platform or a motor for spinning the microfluidic platform, e.g. the spinning platform disclosed herein. The real advantage comes when the centrifugal microfluidic disc is configured such that during rotation of the disc, the liquid in the inlet reservoir will be moved by centrifugal forces outwards, i.e. such that liquid can be transferred, preferably through control of the spinning speed from the inlet reservoir to the outlet reservoir via 1) the inlet channel, 2) the sample (culture) chamber and 3) the effluent channel. I.e. the inlet reservoir is fluidly connected to the inlet channel(s), which is fluidly connected to the sample chamber(s), which correspondingly is fluidly connected to the effluent channel(s), which again is fluidly connected to the outlet reservoir.

I.e. a number of features are integrated in a microfluidic lab-on-a-disc system that may be rotated at a certain speed using e.g. a spinning motor or a rotatable platform. Using the presently disclosed lab-on-a-disc design, a sample containing microorganisms can be studied, e.g. the growth of a biofilm, or mammalian cell growth under the presence of flow across the culture chamber, thus mimicking a more realistic environment for the sample under study, e.g. bacteria/cells. The liquid (culture medium) present in the outlet reservoir, which peruses the sample/culture chamber contains nutrients to facilitate the growth and multiplication of cells. A number of parameters can be varied in order to control the experiment including the amount and composition of nutrients, the flow-rate of the nutrient flow, the oxygen level, among others. Additionally, the disc may feature different surface materials to study the growth of e.g. cells and bacteria on various surfaces. In particular it has been realized that a controlled flow of nutrients can be provided to the microorganisms at low rotation speed, such as a rotation frequency of around 1 Hz, for several hours. At such low rotations speeds, cells are able to thrive and the inventors have realized that even mammalian cells can thrive under such conditions.

Moreover, the microfluidic platform may be used in combination with a range of modules such as an optical microscope, an electrochemical analyser (miniaturized integrated potentiostat), a miniaturised Raman system, these modules providing additional advantages and possibilities when examining experiments conducted using the platform. The present disclosure further address how such modules may be integrated on the platform to provide a complete experimental setup. Accordingly, the presently disclosed multifunctional centrifugal microfluidic disc provides a modular platform for the study of growth of microorganisms, e.g. bacteria, cells, even mammalian cells, and the platform facilitates long-term (e.g. 5 days) cultivation of cells or other in vitro studies that mimics in vivo conditions.

The present disclosure therefore further relates to a method for monitoring microorganisms, such as cells, bacteria, etc., in particular mammalian cells, preferably under the constant supply of nutrients, thereby mimicking in vivo conditions. Such a method can be advantageously be executed using the presently disclosed centrifugal microfluidic disc and the presently disclosed mobile (i.e. portable) centrifugal microfluidic device.

DESCRIPTION OF DRAWINGS

FIG. 42a shows a picture showing an experimental setup, wherein the centrifugal microfluidic platform was used to grow mammalian cells under the influence of flow.

FIGS. 42b and 42c show images of the mammalian cells contained in the cell chamber. The images were taken as part of the experiment shown in FIG. 42a. They show Caco-2 cells in the cell chamber at b) 2 hours after seeding, and c) after 7 days.

DETAILED DESCRIPTION OF THE INVENTION

Figure 1:
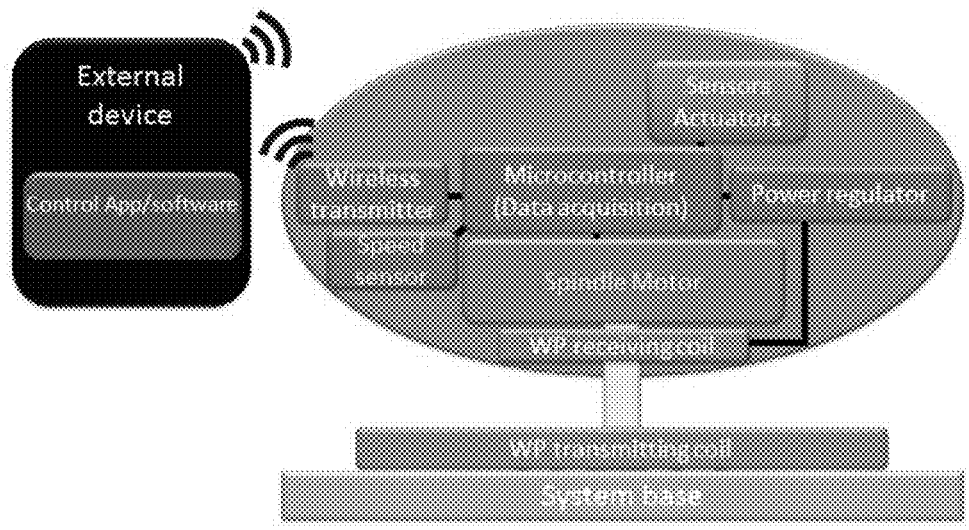
FIG. 1 shows an illustration of one embodiment of the presently disclosed mobile/portable centrifugal microfluidic device.

There are different ways of generating and transferring the mechanical energy generated by a motor to rotation of the platform when the motor is located on the platform. One example of a suitable motor is a spindle motor, e.g. a brushless electrical spindle motor which enables a fast, low noise rotation of the platform resulting in a smooth centrifugation of the sample chambers on the rotatable platform.

One way is letting a drive shaft of the motor coincide with the rotation axle of the platform such the motor directly drives the rotation of the platform. However, it may be more advantageous to provide some kind of gearing between the drive shaft of the motor to better utilize the torque of the motor.

One or more motors may also be located on the platform, each motor equipped with a propeller that generates thrust during rotation. With a suitable arrangement and orientation of the motors this thrust can be utilized to rotate the platform. In this case there are preferably at least two motors such that they can be arranged symmetrically on the platform such that the rotation is stable. This is exemplified in FIGS. 11 and 12 with two motors mounted on the circumference of the platform, both motors provided with propellers mounted directly on the rotation axes of the motors. The rotation axes of the motors are horizontal and oriented to be perpendicular to radiuses through the locations of the motors, i.e. parallel with tangent lines of the platform. Such an orientation of the propellers will provide an optimal conversion of propeller thrust to platform rotation.

In one embodiment, the mobile centrifugal microfluidic device comprises a speed sensor, such as a Hall effect sensor, configured to monitor and control the rotational speed of the platform. This allows the user to monitor and preferably select a specific rotational speed for a given experiment.

The device may be powered by a wireless power arrangement. The device may comprise an inductive wireless power receiver, such as a Qi power receiver, integrated on the platform and configured for receiving energy for powering the rotatable platform through wireless power transmission, typically from a power coil located in the supporting base. The term powering the rotatable platform refers to powering some or all energy-requiring components of the rotatable platform including for instance the motor and the integrated electronic components of the platform. The power coil may be powered by a battery or by an external power supply.

In the preferred embodiment the device may comprise a power regulator, preferably a low noise power regulator configured for powering the device electronics and the motor during operation. The power regulator can be an external power regulator, such as a mobile power regulator e.g. part of the supporting base below the rotatable platform. The power regulator is advantageously integrated on the platform, because the wireless power arrangement can be very noisy, and the power regulator may be very important for low noise measurement during rotation of the platform.

In a further embodiment the mobile centrifugal microfluidic device comprises an electrical generator located on the platform and configured for being powered by rotation of the rotatable platform. The generator may then be arranged for supplying power to the electronic components on the platform. The device may further be configured such that the platform is capable of being manually rotated, for instance by means of a pulley belt setup and an optional hand crank. In combination with the electrical generator this makes the device suitable for sample optical, electrochemical and other analysis also in remote places and without a stable access to electricity. In a further embodiment the device comprises an energy storage device, such as a capacitor or a battery, which can also function as a solution if electricity is available but the supply not reliable, or if the device has to be frequently relocated as it eliminates the constant need for external power supply. The energy storage device may be charged by a power regulator, e.g. the same power regulator as the one powering the mobile centrifugal microfluidic device upon non-battery driven operation.

In one embodiment the device comprises a wireless transmitter for wireless communication with an external communication device, which enables monitoring and/or control of the device from an external device, such as through a smartphone app interphase. In this way the mobile centrifugal microfluidic device can be controlled by an external device such as a smartphone. Also the results from a given sample analysis may be readable via wireless communication to an external device. This makes the device user-friendly and the results of the analysis easy to read.

In another embodiment, the device functions as a stand-alone analyzing device. The results of the sample analysis among other parameters of interest such as rotational speed, battery level etc. can be read out for instance by a spinning display integrated in the device. If the device comprise a spinning display it may be located on the rotatable platform and configured for displaying measurement parameters during rotation of the platform, measurement parameter such as progress of detection, input parameters, rotational speed and/or sensing results. Spinning displays has the advantage that it is possible to read the process and results of the analysis while the rotatable platform is still spinning. Hence one can avoid having to stop the experiment in order to read out the parameters. This spinning display may be configured to be visible from the top of the platform and/or from the side of the platform using either top display and/or a side display.

The device may contain one or more sample chambers of which one or more may be a transparent microfluidic sample chamber, which is visible from the top of the platform. The sample chambers may be provided in a separate lab-on-a-disc configured for engaging with the rotatable platform. As an example, the sample chambers may be microfluidic sample chambers located in a centrifugal microfluidic disc as described herein. One or more light sources, preferably LEDs may be provided under the sample chamber. This allows strobe photography of the microfluidic channels synchronized with the rotation of the platform by a camera placed above the rotating platform (see FIG. 17). This is important as the photos can be used in the analysis of the process and results of the sample under investigation.

The device may be configured such that the rotation platform is capable of having a rotational speed of at least 5 RPM, more preferably at least 20 RPM, yet more preferably at least 100 RPM, even more preferably at least 1000 RPM, most preferably at least 3000 RPM, for example between 10 and 100 RPM. In addition the mobile centrifugal microfluidic device may comprise at least one light source, such as an LED, on the platform for illuminating the sample. This makes imaging of the microfluidic channels much easier. For slow rotation speeds, as also described herein, The device may be configured such that the rotation platform is capable of having a stable rotational speed of less than 100 RPM, or less than 80 RPM, most preferably around or less than 60 RPM.

The present disclosure further relates to a mobile microfluidic system possibly including a software solution. The system may comprise the presently disclosed mobile microfluidic device and a software solution executable on an external device for controlling and monitoring the device and sample analysis from the external device. The software application of the system may be configured to synchronize a camera on the remote device, such as a smartphone, and optionally a light source on the remote device and/or on mobile centrifugal microfluidic device with the rotation of the platform for strobe photography of the sample during rotation of the platform. This enables the system to integrate the information provided from the strobe photography in a single user interphase and use the information provided from the images to control the device. The software application may also be configured for receiving sensing results and/or for controlling and/or monitoring of the rotational speed of the platform. In this way the analysis results and operational parameters of the mobile microfluidic device can be read out to an external device possible with a user friendly interface such as an app interface. In addition the mobile centrifugal microfluidic device may use equipment from the external device such as the camera or LED light from a smartphone which may be desirable in the process of analysis. A test has shown that a typical state-of-the-art commercial smartphone's camera is suitable for strobe photography. High quality images of a rotating platform acquired with very short exposure time of $\frac{1}{10000}$, $\frac{1}{20000}$, $\frac{1}{50000}$ seconds and only illuminated with smartphone's built-in light source, showed that such imaging can be applied even for high spinning speeds of the platform.

The present disclosure further relates to a centrifugal microfluidic disc for in vitro studies of microorganisms, such as bacterial cells, or mammalian cells. The platform may be used for studying a wide range of microorganisms such as bacteria, archaea, protozoa, algae, fungi, viruses, or multicellular eukaryotes. As an example, it may be used for studying the growth of bacteria in the culture chamber. The bacteria typically forms a biofilm. The growth of this biofilm may be studied under the variation of a number of parameters e.g. the amount of nutrients available to the bacteria, and the flow-rate of the nutrient flow passing through the sample chamber. Different materials for the surface that the biofilm forms on might also be investigated.

Typically, in the field of microbiology, one distinguishes between static cell culture models and perfusion models. The former may include culturing cells in a petri dish, whereas the latter studies the cells under the influence of flow. The problem with static models is that they typically do not represent or mimic an environment that is similar to e.g. a human body, wherein the bacteria is under the influence of a flow. Perfusion models provide a more realistic environment; however, they often require large experimental setups such as the one shown in FIG. 26. While a large number of lab-on-a-chip systems exist, they typically employ a microfluidic chip that needs to be part of such a large setup including a peristaltic pump, bubble traps, inlet/outlet reservoir, and lots of tubing to connect all the components.

Figure 22:
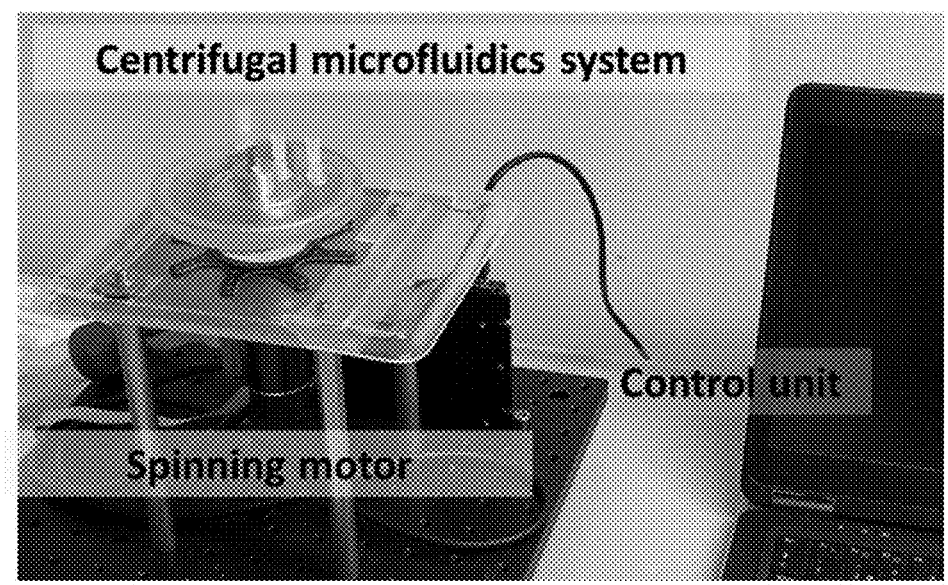
FIG. 22 shows the bacterial culture disc as part of an experimental setup placed in bacterial culture room at 37° C. The disc engages with a rotatable platform, which is rotated by a spinning motor.

The presently disclosed centrifugal microfluidic platform provides a much smaller experimental platform (e.g. having the footprint of a compact disc) by integrating some of the components, e.g. the inlet and outlet reservoir and the microfluidic channels, whereas other components such as the external pump may be avoided and replaced by a simple spinning motor (FIG. 22). The centrifugal microfluidic disc is included in the bottom left of FIG. 26 for size comparison. The spinning of the disc and the resulting centrifugal force obviates the need for a pump. Furthermore, the applicant has found that by spinning the disc at a certain frequency, the flow rate in the channels can be controlled accordingly (cf. FIG. 44). Specifically, a very constant and low flow-rate can be achieved for a constant rotational frequency, said low constant flow-rate being important in some applications such as long term growth of bacterial and mammalian cells. The controlled flow-rate is achieved by a combination of the features on the disc and the rotational frequency of the disc.

Figure 19:
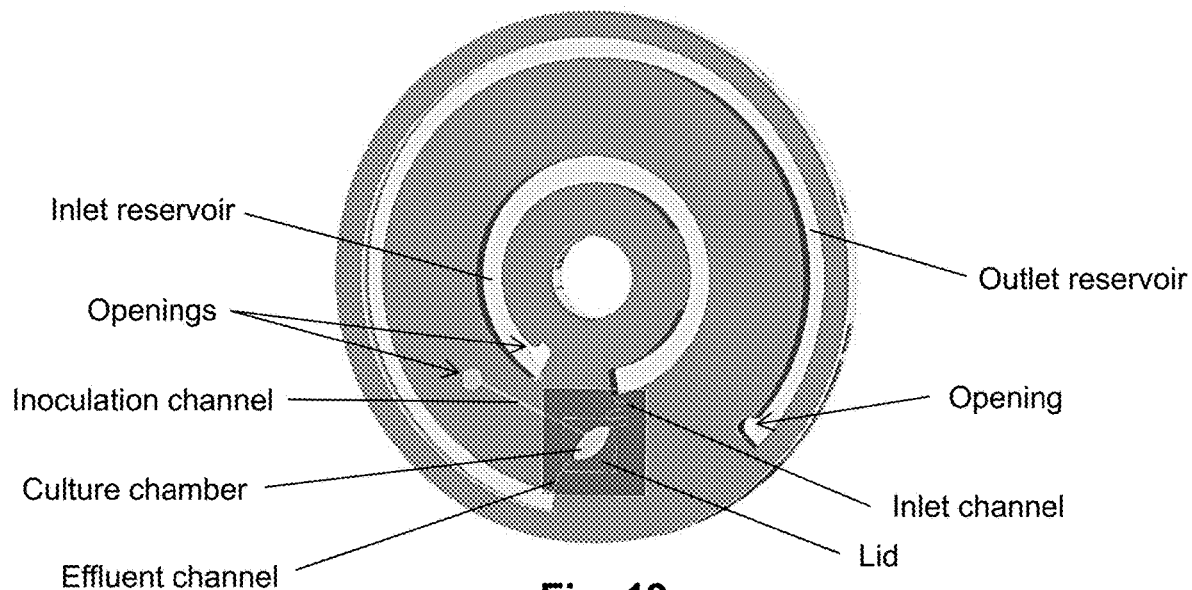
FIG. 19 shows a schematic of the centrifugal microfluidic disc according to the present disclosure. This embodiment centrifugal microfluidic disc is in the form of a cell culture disc configured for engaging with a rotatable platform.

In one embodiment, the centrifugal microfluidic platform constitutes a lab-on-a-disc unit as shown in FIG. 19. This embodiment is described in the following. The lab-on-a-disc comprises multiple features including an inlet reservoir, an inlet channel, a culture chamber, optionally an inoculation channel, an effluent channel, and an outlet reservoir. It may further comprise a lid placed on top of the culture chamber to seal the chamber. The lid allows bacteria to grow in the top of the chamber on the surface of the lid facing the inside of the chamber. The design of the chamber allows the perfusion of nutrients and oxygen via a flow through the chamber. In case of a bacterial biofilm formed on the lid, the flow reaches the bacterial cells from below. The lid is preferably transparent, such that the formation of a biofilm on the surface of the lid can be detected from the outside e.g. using a microscope. Since the biofilm forms at the top of the culture chamber, this detection and/or imaging is optimized. Another advantage of configuring the culture chamber for bacterial growth at the top of the chamber is that the bacteria then do not create occlusions close to the inlet and outlet of the chamber, provided said inlet/outlet are placed at the bottom of the chamber (see FIG. 29). Yet another advantage is that the bacteria is not affected by shear stress. The influence of the flow-rate and shear stress has been investigated through numerical simulations and found not to affect the growth of the bacteria negatively (cf. simulation results shown in FIG. 45-46).

The disc may further comprise a plurality of openings for accessing said reservoirs or channels. In one embodiment, the disc comprises three openings: One inlet opening, one inoculation inlet, and one opening to the outlet reservoir. The inlet and outlet reservoirs preferably resemble the arc of a circle, wherein the center of the circle is located at the center of the disc. The inlet reservoir is placed near the center of the disc, while the outlet reservoir is placed near the edge of the disc. Furthermore, the microfluidic platform is preferably configured such that the two reservoirs, the inlet reservoir and the outlet reservoir, are separated by a constant radial distance (see e.g. FIG. 27 or FIG. 41). A uniform radial distance ensures that the pressure difference between the inlet reservoir and the outlet reservoir will be constant during rotation of the platform as well. This is important, since the centrifugal force and the resulting pressure difference is the driving force of the liquid moving from the inlet reservoir towards the outlet reservoir. Thus, the design of the microfluidic platform facilitates a constant flow rate for a given rotational frequency, which is important for experiments carried out in the cell chamber. Furthermore, the configuration allows for the placement of one or more culture chambers between the two reservoirs, wherein the culture chambers are fluidly connected to the two reservoirs. It further allows that a liquid may flow at a constant flow rate from the inlet reservoir to the outlet reservoir via the culture chamber, provided the disc is rotated such that the liquid is forced to flow towards the edge of the disc due to centrifugal forces.

The inlet reservoir is preferably able to store a large volume of liquid compared to the volume of the culture chamber, such as at least 10, or at least 30 times, preferably at least 50 times as much as the culture chamber. In one embodiment, the inlet reservoir can hold approximately 3 mL of liquid and the culture chamber can hold approximately 55 µL. In the first end of the inlet reservoir there is preferably an opening to the outside such that liquid may be added to the inlet reservoir e.g. using a syringe. Subsequent to filling the reservoir with liquid, the opening may be closed again e.g. using a filter. In one embodiment, each opening is provided with a Luer connector configured for engaging with either a syringe or a filter. The Luer connectors and filters are visible on FIG. 21. At the distal end of the inlet reservoir, the reservoir connects with an inlet channel of smaller dimensions.

The inlet channel serves the purpose of providing a larger fluidic resistance and thereby slowing the speed of a liquid flowing during an experiment. In a preferred embodiment, the inlet channel is formed as a serpentine channel. An advantage of this particular shape of the inlet channel is that it allows a better mixing of nutrients. The culture chamber is designed to resemble an oval shape in order to avoid sharp edges and trapping of air bubbles. It is mainly the cross-sectional area of the inlet channel coupled with the rotational speed and the size of the disc that controls the flow of liquid into the culture chamber.

Figure 29:
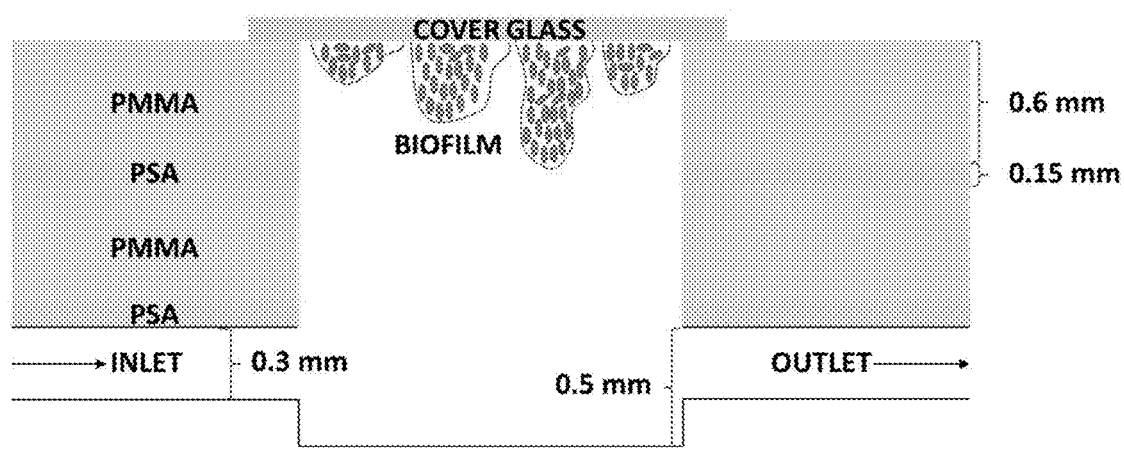
FIG. 29 shows schematically, in close-up and in cross-section, a culture chamber of the bacterial culture disc according to an embodiment of the present disclosure.

In one embodiment particularly well suited for culturing bacterial cells, the inlet and outlet channels are preferably placed near the bottom of the culture chamber to provide enough space for bacterial biofilm growth and to allow continuous perfusion of nutrients (see FIG. 29). The embodiment of the platform designed for bacterial growth, preferably further features a cover glass to close the cell chamber in order to have an optimal surface for bacteria adhesion and good quality imaging e.g. using scatter confocal scanning laser microscopy. Thus, the cell culture chamber is suitable for cell culturing.

Figure 43:
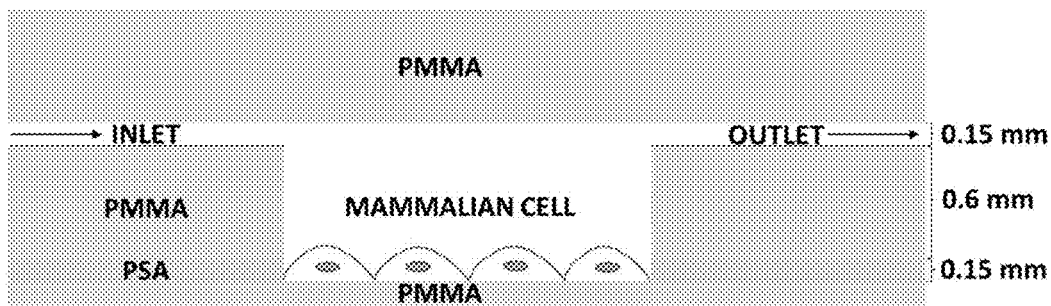
FIG. 43 shows schematically, in close-up and in cross-section, a mammalian culture chamber according to an embodiment of the presently disclosed microfluidic platform. Notice that the culture chamber is configured such that the mammalian cells are adhering to the bottom of the culture chamber.

In another embodiment, the culture chamber is designed to facilitate growth of adherent cells on the bottom of the culture chamber (cf. FIG. 43). This design is optimized to facilitate the accommodation and growth of mammalian cells. This is achieved by placing the inlet and outlet of the culture chamber at the top of the chamber, such that the flow through the culture chamber does not stress the cells and thereby negatively affect the cell growth. This is crucial for mammalian cells, since they are more easily affected by flow. In this embodiment, the liquid flow containing nutrients and oxygen reaches the cells from the top, while avoiding a large flow velocity across the surface of the cells. Using mathematical and physical simulations, it was found that the shear stress and the flow rate were of sufficiently low values such that they do not affect the growth of the bacteria negatively. FIGS. 45-48 show results from the simulation. Furthermore, in this application there is no need for a cover glass. Instead, a whole layer such as a PMMA layer may constitute a lid of the mammalian culture chamber. This lid is preferably transparent, such that optical observation may be performed through the lid.

Figure 30:
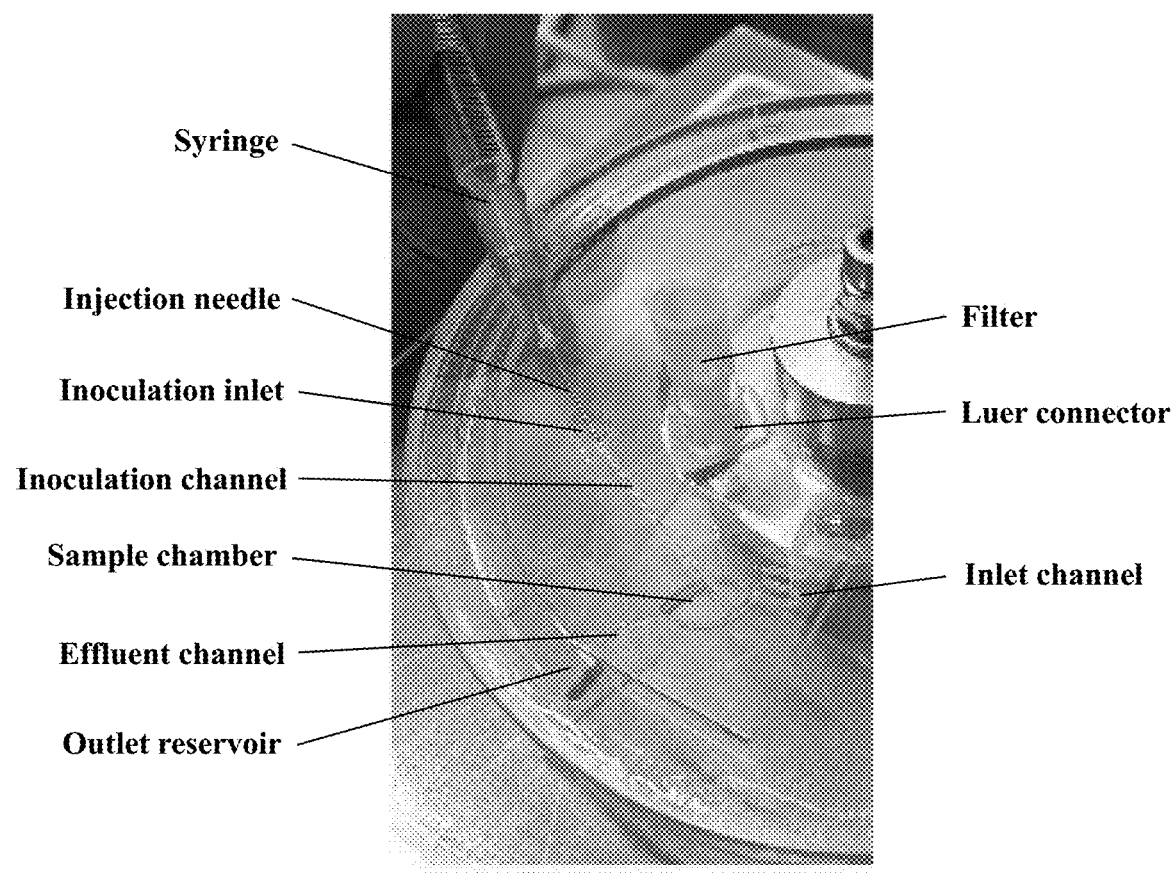
FIG. 30 shows a picture of the centrifugal microfluidic platform placed on a rotatable platform. The picture shows an example of how the inoculation of the sample (e.g. cell, bacteria or real patent samples) can be carried out by placing it in the culture chamber.

The inoculation channel serves the purpose of allowing the placement of an inoculum, such as a diluted bacteria culture or mammalian cells in suspension, in the culture chamber. In a preferred embodiment, this is achieved by dimensioning the inoculation channel such that a syringe needle may enter the culture chamber via the inoculation channel. Then, the inoculum may be delivered by the syringe (cf. FIG. 28). The inoculation channel preferably features an opening in the proximal end such that the channel may be accessed from the outside. FIG. 30 shows how an injection needle may be inserted through such an opening (the inoculation inlet). The needle can preferably fit inside the channel such that it can be pressed through the entirety of said channel and reach the sample chamber. Subsequent to inoculation, the opening may be closed using a combination of a Luer connector and a filter, as previously described.

The effluent channel serves the purpose of connecting the culture chamber with the outlet reservoir. Thus, it facilitates the passage of waste and clusters. In a preferred embodiment, the effluent channel is an approximately straight channel or slightly curved channel. The effect of this geometry is that the channel ensures that no clogging occurs such that waste is efficiently transported to the waste/outlet reservoir.

Figure 23:
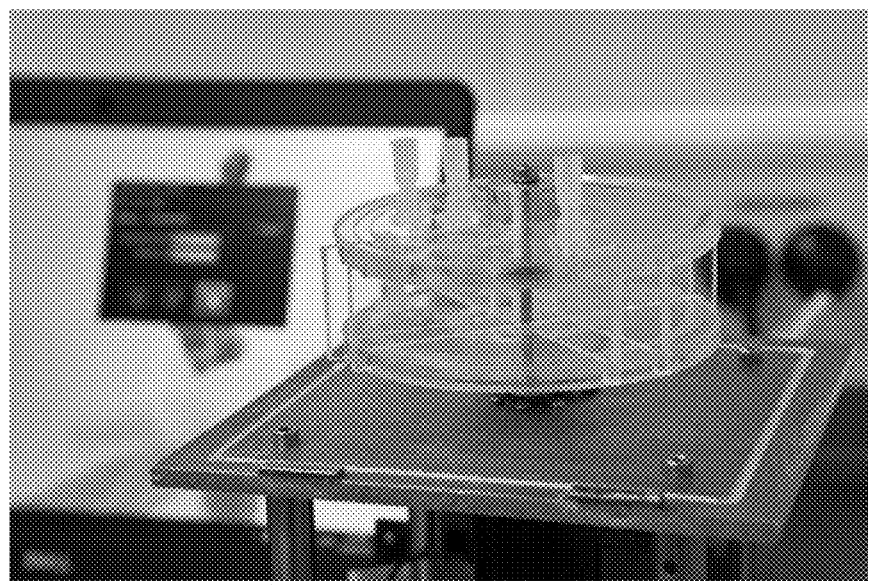
FIG. 23 shows two cell culture discs according to the present disclosure, wherein the discs are stacked upon each other for increased throughput
Figure 24:
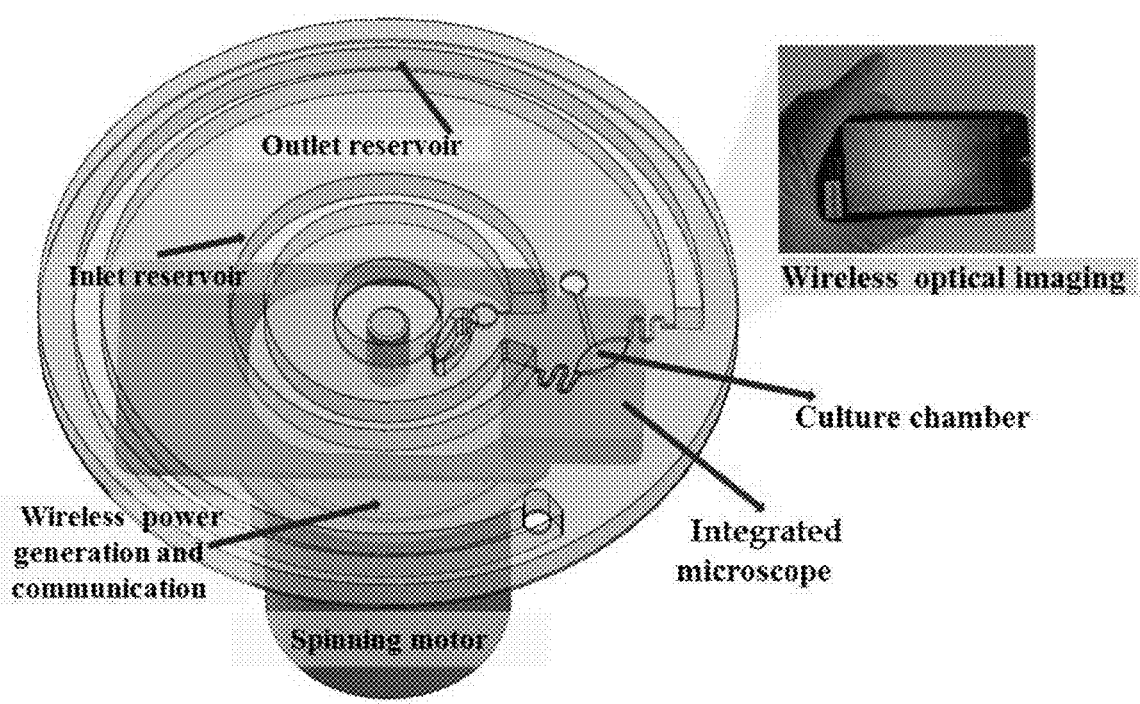
FIG. 24 shows a modular lab-on-a-disc platform according to the present disclosure, wherein the platform comprises a cell culture disc, an optical microscope, wireless power generation, wireless communication, and a spinning motor.

The disc is configured for engaging with a rotatable platform or a spinning motor such that the disc may be rotated (see FIG. 24). The means for engaging with a rotatable platform may be a central hole in the disc. The lab-on-a-disc is suitable for stacking with other similar lab-on-a-discs as shown on FIG. 23. The disc is configured for the integration of one or more modules with the platform. Such modules may include an optical microscope, a camera, an electrochemical analyzer, a potentiostat, or a miniaturized Raman system (cf. FIG. 25).

The following is an example of how to fabricate a centrifugal microfluidic disc according to the present disclosure. The embodiment described in the following is particularly well suited for culturing bacterial cells and for the study of biofilm formation.

Figure 20:
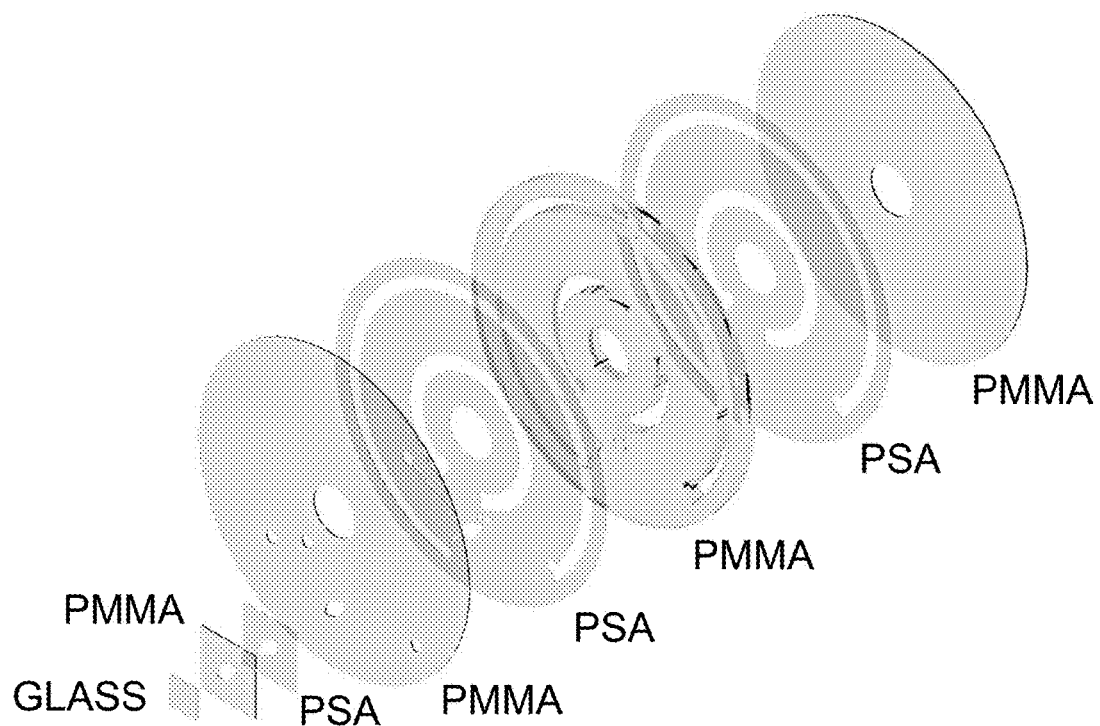
FIG. 20 shows a schematic of how the cell culture disc according to the present disclosure may be assembled from multiple layers to form a microfluidic disc enclosing several channels. This particular embodiment is suited for studying bacterial biofilms, said biofilm growing in the top of the culture chamber. This biofilm preferably forms on the lid of the culture chamber.

The disc comprises eight layers, namely four layers of poly(methyl methacrylate) (PMMA), three layers of pressure sensitive double adhesive tape (PSA) and one layer of glass (see FIG. 20). The disc has a 100 mm outer diameter and a of 15.35 mm inner diameter. Specifically, the biological disc was fabricated using two layers of 0.60 mm thick PMMA, one layer of 5 mm thick PMMA, and two layers of 0.15 mm thick PSA. A 20×20 mm² layer of 0.60 mm thick PMMA, together with a 20×20 mm² layer of 0.15 mm thick PSA and 18×18 mm² layer of 0.15 mm thick cover glass were designed to maximize the culture volume and the detection. The PMMA layers were fabricated using laser ablation technique except for the channels and the culture chamber, which were fabricated using micromilling. PMMA layers, previously cleaned with sonication and ethanol, and PSA layers were assembled using a bonding press with a force of 10 KN in order to maximize the adhesion and to remove possible bubbles between layers. The cover glass was separately glued using a silicone glue and dried overnight. Filters with a 3 mm diameter membrane and pore size of 0.20 μm were used to maintain the sterile environment in the disc while keeping the oxygen flow in the platform through the pores. Luer connectors were fabricated in cyclic olefin-copolymer (COC) polymer using injection molding. Luer connectors were fixed on venting and loading holes facilitating the introduction of filters. The assembled centrifugal microfluidic disc can be seen in FIG. 21. The centrifugal microfluidic disc may be fabricated using other manufacturing methods for fabricating lab-on-a-discs. As an example, the microfluidic disc may be fabricated using injection moulding, which is suitable for industrial scale production of the disc.

In another embodiment of the centrifugal microfluidic disc, said embodiment suited for culturing mammalian cells, the fabrication of the disc may be carried out using only laser ablation and subsequently assembled using an adhesive layer, e.g. PSA. As an example, the disc for culturing mammalian cells may comprise seven layers of alternating PMMA and PSA layers as shown on FIG. 40. The layers are preferably bonded together to form a single unit, such that the layers are permanently fixed to each other. Notice that this embodiment does not need a lid or a cover glass on top of the culture chamber as shown in FIG. 19-20. On the contrary, the mammalian culture chamber is enclosed entirely in the microfluidic disc once it is manufactured, such that the only access from the outside to the chamber is via the openings in the disc, preferably via the inoculation channel.

The following is an example of how to set up an experiment using the centrifugal microfluidic disc according to the present disclosure. Initially, the entire system including the microfluidic channels is sterilized. After the sterilization of the disc, the system was filled with a medium and left overnight at a low flow rate (pump set on 0.5 RPM, around 60 μL/min). The inoculation of the bacteria in the sterilized disc was achieved by addition of 40 μL overnight culture of 1:100 diluted P. aeruginosa though the inoculation channel situated in close proximity to the cell culture chamber (see FIG. 30). During inoculation, the loading opening was closed to create a back-pressure avoiding bacteria occlusion in the serpentine channel. The adhesion of the bacteria in the culture chamber was carried out in stop flow for one hour, followed by rotation at the set frequency. The total volume of the cell chamber is around 55 μL and only 40 μL of PAO1 was inoculated in order to prevent the introduction of bacteria in the inlet channel. The inoculation in the flow system was achieved by stopping the pump and adding 250 μL overnight culture of 1:100 diluted P. aeruginosa in the selected channels in proximity of the flow chamber. It was important to clamp the silicone tubes which were feeding the channels in order to avoid a back flow. The tubes were sterilized with ethanol before inoculation and the inoculation hole sealed with silicone glue after it. The adhesion of the bacteria in the flow chip was carried out in stop flow for one hour and with the chip turned upside down. After one hour, clamps were removed and the flow started. The bacteria were cultured for 72 hours in order to form a mature biofilm before introducing the antibiotic in the culture medium. Propidium iodide was used as a DNA stain to evaluate biofilm viability, since it binds to the nucleus of dead cell making them fluoresced red. 2 μL of pure propidium iodide was introduced in the inlet reservoir. The percentage of alive bacteria in the biofilm was between 80-90% of the total biomass before treatment. Ciprofloxacin with a final concentration of 4 μg/mL was introduced and diluted with medium and propidium iodide in the inlet reservoir. Antibiotic and propidium iodide were introduced with the help of a pipette through the loading hole, avoiding to create pressure on biofilm.

Figure 32:
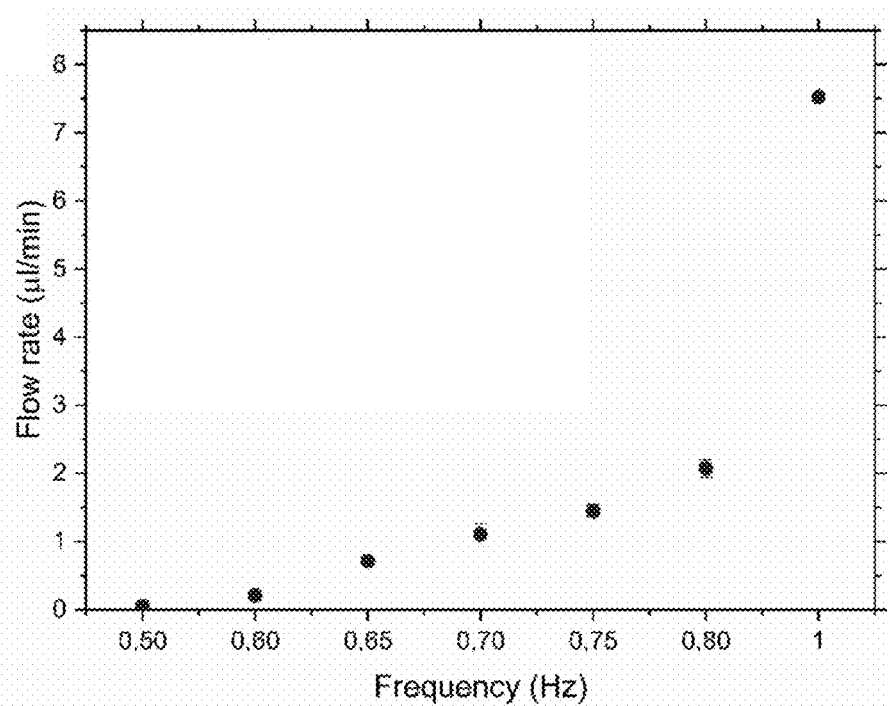
FIG. 32 shows a calibration curve that provides a relation between the rotational frequency of the platform and the corresponding achieved flow rate through the culture chamber.

To enable long-term perfusion culture it is important to precisely control the flow rate as well as to ensure constant flow rate for the duration of the experiment. It was found that a stable flow rate could be achieved when keeping the front of the liquid stable during rotation. As mentioned earlier, priming of the culture chamber and creating the semi-circular shape meniscus in the inlet was achieved at a high (2 Hz) rotational speed. Prior to the calibration, the rotational frequency was set to low (0.35 Hz) for 2 hours, to slow down the flow and achieve equilibrium, before changing the speed to the lowest evaluated frequency. The rotational frequencies were gradually increased from 0.50 Hz up to 1 Hz and the volume of the liquid at defined time was measured. In FIG. 32, the obtained calibration curve with culture medium is presented recorded using a sterilized lab-on-a-disc according to the present disclosure. The calibration curve was constructed from the images taken in the inlet reservoir at a defined time (depending on the frequency). Each data point was taken three times. The calculation of the flow rate, volume of the liquid, was calculated using a computer code. It can be seen that the flow rate can be accurately controlled in the linear range between 55 nL/min and 2 μL/min with a variation below 15%. It was also found that the variation between different platforms was around 10%, based on three number of tested devices. Additionally, the stability of the flow rate over time was investigated for up to 72 hours, wherein a variation of approximately 5% was determined.

The inventors evaluated both the shear stress in the centrifugal microfluidic platform due to the liquid flow, as well as the effect induced by centrifugal forces, due to rotation. 3D computational fluid dynamics (CFD) simulations were used to mimic the fluid flow through the culture chamber in three spatial dimensions and to calculate the resulting shear stress at the top of the sample chamber. The numerical simulations rely on the equation for continuity being considered along with Navier-Stokes equations. The model for the numerical simulations was build assuming a steady state flow, presence of incompressible Newtonian fluid, negligible Coriolis force and Stokes flow (negligible inertial term). From these considerations, the Navier-Stokes equations could be reduced to the Stokes equation. The boundary conditions used in the simulations include no-slip boundary conditions at the walls, experimentally measured flow velocity at the inlet, and 0 Pa gauge pressure at the outlet. To evaluate the shear stress in the cell chamber, a numerical model was used. Relying on the experimentally measured flow rates as input, the shear stress was calculated as the product of the shear rate and dynamic viscosity of the fluid. Additionally, it was assumed that the shear stress effect on the biofilm is either equal to or lower than the wall shear stress, (shear stress at the edges of the cell chamber), in the top part of the cell chamber. The values of interest are the average and maximum wall shear stress. It was found that the maximum shear stress occurs in the cell chamber just after the inlet and just before the outlet. This is caused by the sudden expansion and contraction of the geometry, causing the flow velocity to locally increase. The calculated maximum shear stress is approximately an order of magnitude higher than the average shear stress in the cell culture chamber, while the highest calculated shear stress at 2 µL/min (0.8 Hz) is 0.6 mPa. Based on our calculations, the bacteria growing in the cell culture chamber are exposed to a rather low shear stress. Thus, it can be concluded that the flow rate used to operate the platform will not negatively affect the cells on the biofilm formation.

During rotation, the biofilm and the surrounding media within the cell chamber are also exposed to centrifugal forces. Depending on the difference between the buoyant density of the biofilm compared to the surrounding medium, the biofilm will either experience a force inwards or outwards from the center. Using an expression for the centrifugal buoyancy force on a spherical object, it was assessed that the centrifugal forces became lower as the buoyant density of the cells become more similar to the surrounding medium. The buoyant density of bacterial cells is approximately the same as the surrounding media M9, therefore at the low angular velocities (flow rates between 0.3 µL/min to 1 µL/min) used in this platform, the forces acting upon the cells and surrounding medium will be almost equivalent. Therefore, it can be concluded that the centrifugal force has a negligible effect on the formation of a biofilm in the chamber. It is worth mentioning that sufficiently high angular velocity, thousands of g-forces (gravitational acceleration), will cause the buoyant force to be large enough to have a significant effect. In an experiment, the microfluidic platform was rotated at 1 Hz (6.28 rad/s) to evaluate the centrifugal force. At a distance from the center of rotation of 32 mm (in the center of the cell chamber), the relative centrifugal force in the platform was only 0.128 g, meaning that the cells and surrounding media will experience an acceleration out from the disc equal to about 13% of earths gravitational acceleration.

One of the main contributors to growth and decay of bacterial biofilms is the transport of nutrients and waste to and from the growth chamber 49. In a hydrodynamic system such as the one described here, the contribution of convective mass transport can be quantified using the non-dimensional Péclet number, which corresponds to the Reynolds number multiplied by the Schmidt number. For water and oxygen, the Schmidt number is large (approximately 500), resulting in the Péclet number being orders of magnitude larger than the Reynolds number, meaning that the nutrients transport depend primarily on the flow rate. Assuming a characteristic length of 1 mm, the Péclet number for the range of Reynolds numbers used in this study will be in the order of 10 to 100 in respect of the lowest and highest flow rate used to culture bacteria in the experiments. The convective transport of nutrients has a significant impact on the nutrient supply to the cell chamber even at the low flow velocities used in this platform.

Figure 40:
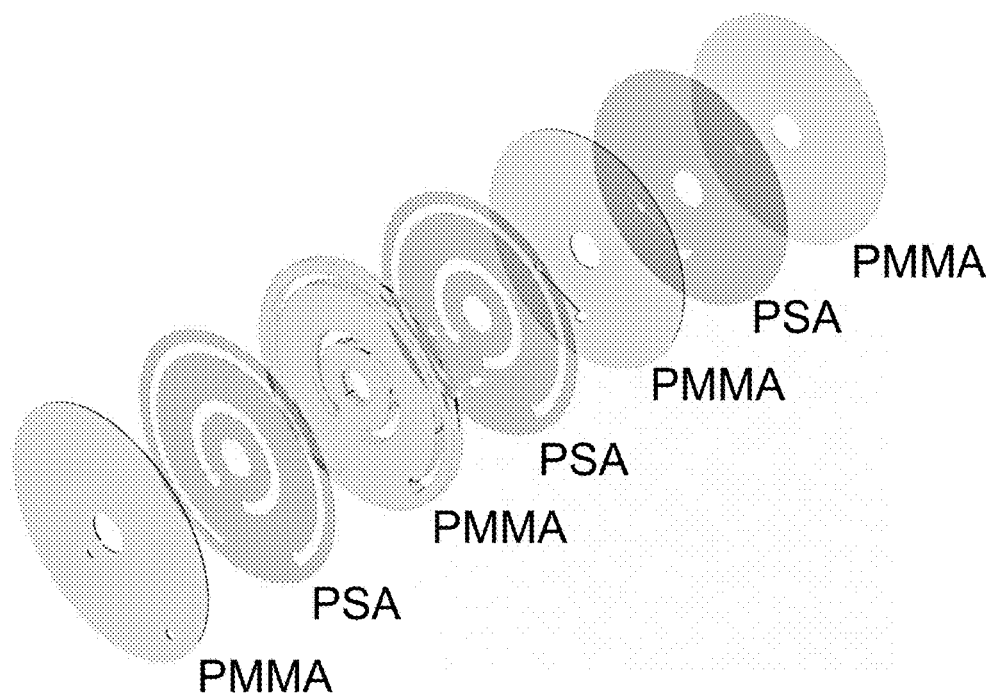
FIG. 40 shows an exploded view of an embodiment of the centrifugal microfluidic platform according to the present disclosure. This embodiment is suitable for growing mammalian cells in the cell chamber. It features alternating layers of PMMA and PSA, however the platform may also be manufactured using other techniques such as injection moulding.
Figure 41:
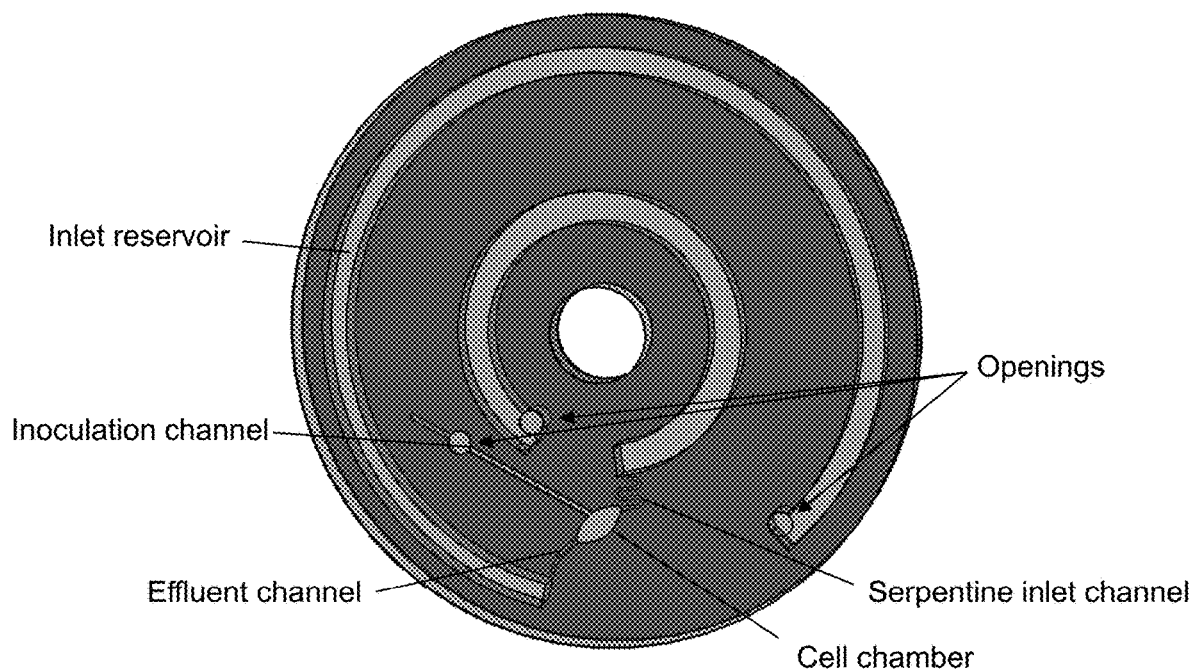
FIG. 41 shows a schematic of an embodiment of the centrifugal microfluidic disc according to the present disclosure. This embodiment is suitable for growing mammalian cells in the cell chamber. Notice that it does not feature the lid shown in FIG. 19. A cross-sectional view of the disc can be seen in FIG. 43.

For mammalian cell culture we performed similar calculation as explained above calculating the effect of flow rate (shear stress) on the adherent cells. The flow rates used in the case of the mammalian cell culture (~100 nL/min) have no adversary effect on the cells. In FIG. 40 or 41 it is presented the optical images of cells, 2 hours after inoculation (FIG. 42b), when the cells are already attached to the bottom of the culture chamber and after seven days culture (FIG. 42c). It needs to be mentioned that prior to the inoculation of the mammalian cells, the lab-on-a-disc was sterilized using a similar procedure already described for the bacterial culture. Despite the fact that the mammalian culture medium contains proteins, which could lead to foaming and bubble formation in the flow, no bubble formation was observed in the microfluidic system. The mammalian culture platform was placed in an incubator (see FIG. 42a) to precisely control the temperature and gas composition as well as the humidity of the environment surrounding the microfluidic platform, is shown in FIG. 40 or 41. The photograph also shows the compactness of the system, and that the platform is compatible to be used for long-term cell culture in a standard incubator.

Detailed Description of Drawings

FIG. 1 shows an illustration of one embodiment of the presently disclosed mobile centrifugal microfluidic device in which the device contain a system base which includes a wireless power (WP) coil and a WP receiving coil for wirelessly transferring electrical energy between the system base and rotating platform. The wireless power transfer powers to a spindle motor integrated on the rotatable platform. The WP receiving coil also powers a wireless transmitter (e.g. Bluetooth, Wifi or ZigBee) enabling communication with an external device, e.g. a mobile device such as a smartphone and/or a computer, a speed sensor such as a hall sensor, a power regulator and a data acquisition component, this can all controlled by a microcontroller.

Figure 2:
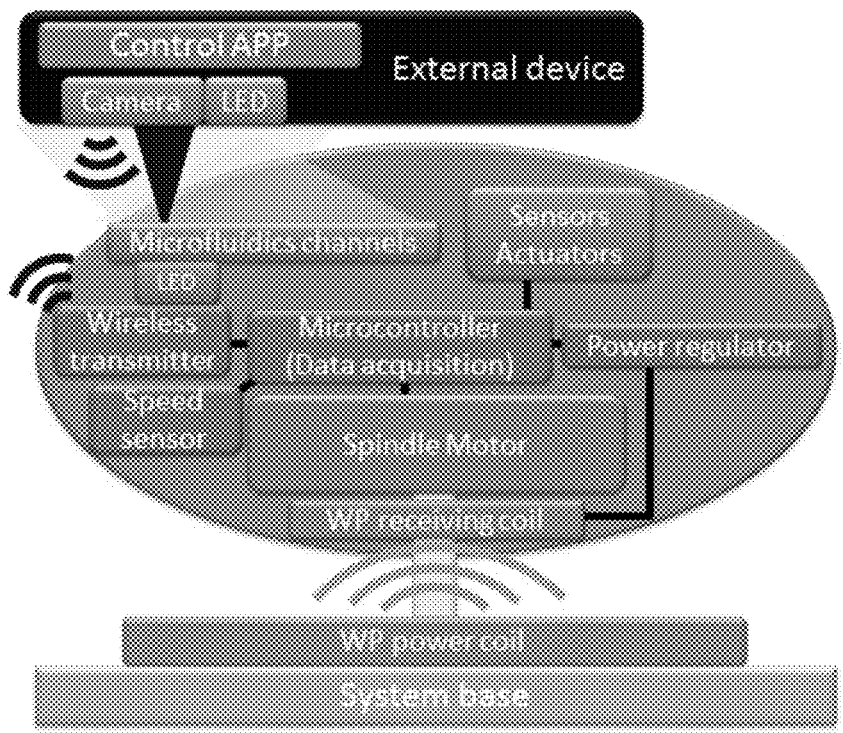
FIG. 2 shows an illustration of the embodiment of FIG. 1 further comprising micro-fluidic channels, sensors and actuators and a LED for illuminating a sample, i.e. a LoD setup.

FIG. 2 shows an illustration of the embodiment of FIG. 1 further comprising micro-fluidic channels, sensors and actuators and a LED for illuminating a sample, i.e. a LoD setup. The device can be controlled by a software application executable on an external device (mobile device and/or computer) such that the camera and light source on the external device can be used for imaging and illumination.

Figure 3:
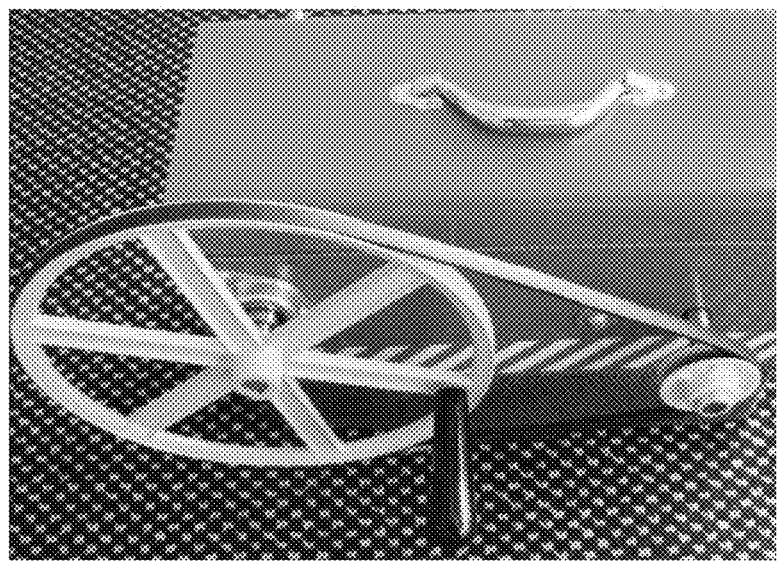
FIG. 3 is a photo of a pulley belt setup for manual powering of the presently disclosed device.

FIG. 3 is a photo of a pulley belt setup for manual powering of the presently disclosed device.

Figure 4:
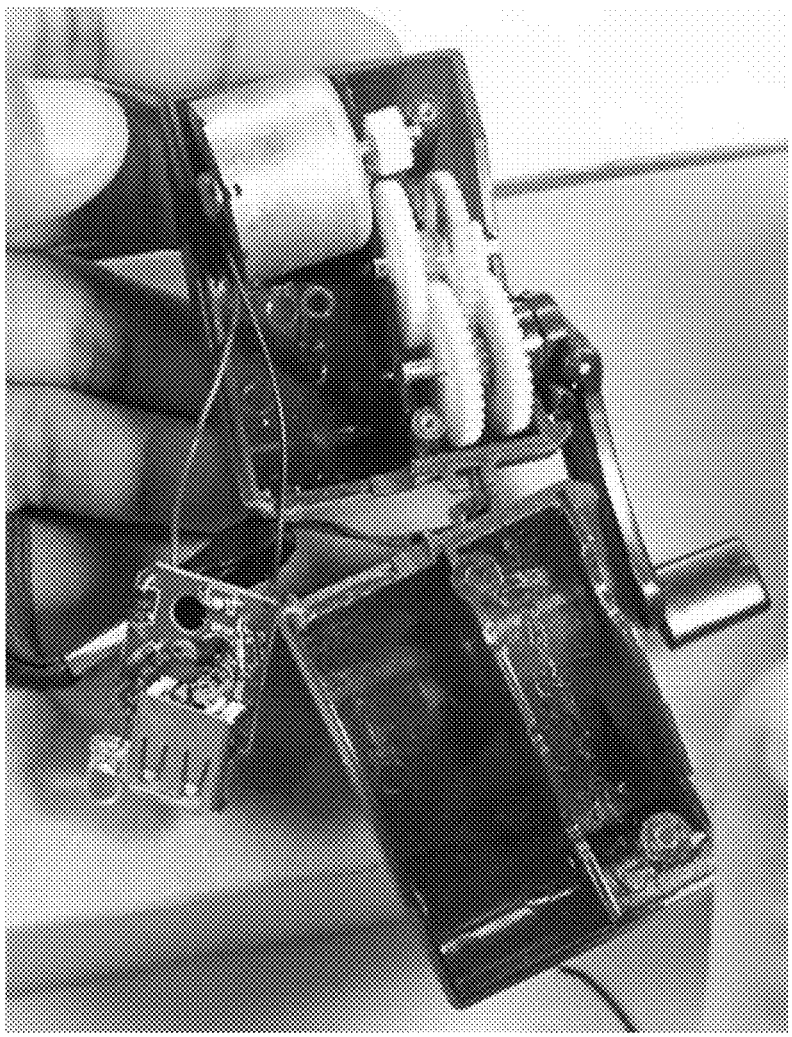
FIG. 4 is a photo of a hand crank generator for manual powering of the presently disclosed device.

FIG. 4 is a photo of a hand crank generator for manual powering of the presently disclosed device.

Figure 5:
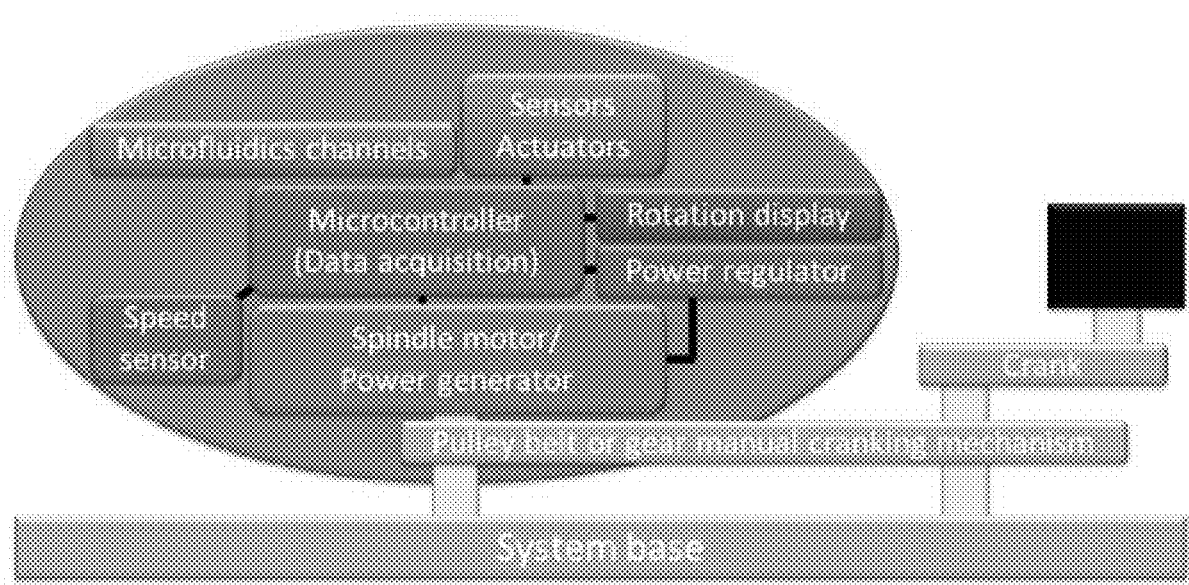
FIG. 5 largely corresponds to the setups of FIGS. 1 and 2, with the notable different that the device is manually powered via a pulley belt or cranking mechanism.

FIG. 5 largely corresponds to the setups of FIGS. 1 and 2, with the notable different that the device is manually powered via a pulley belt or cranking mechanism.

Figure 6:
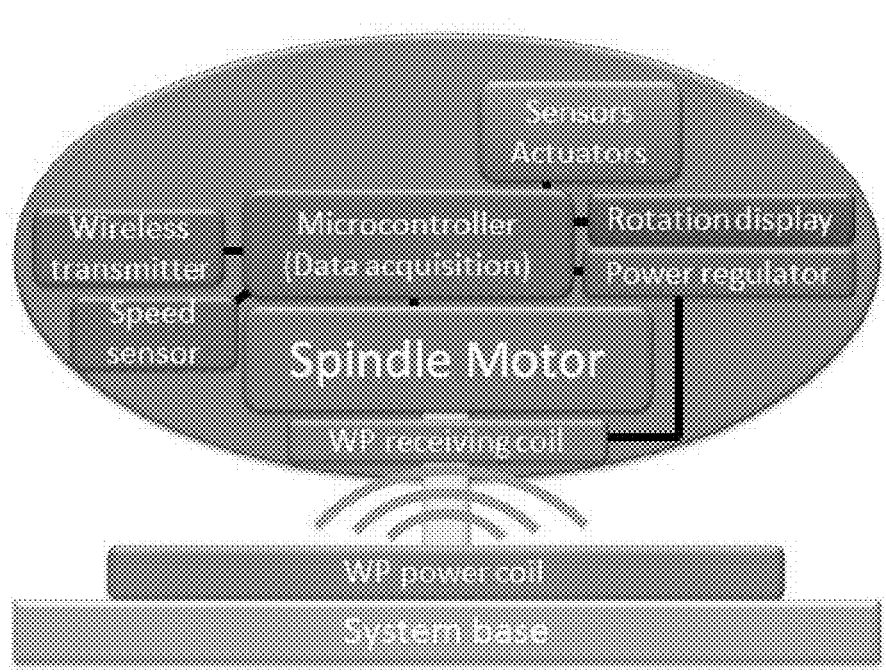
FIG. 6 largely corresponds to the setup of FIG. 2 and also comprising a rotation display.

FIG. 6 largely corresponds to the setup of FIG. 2 and also comprising a rotation display.

Figure 7:
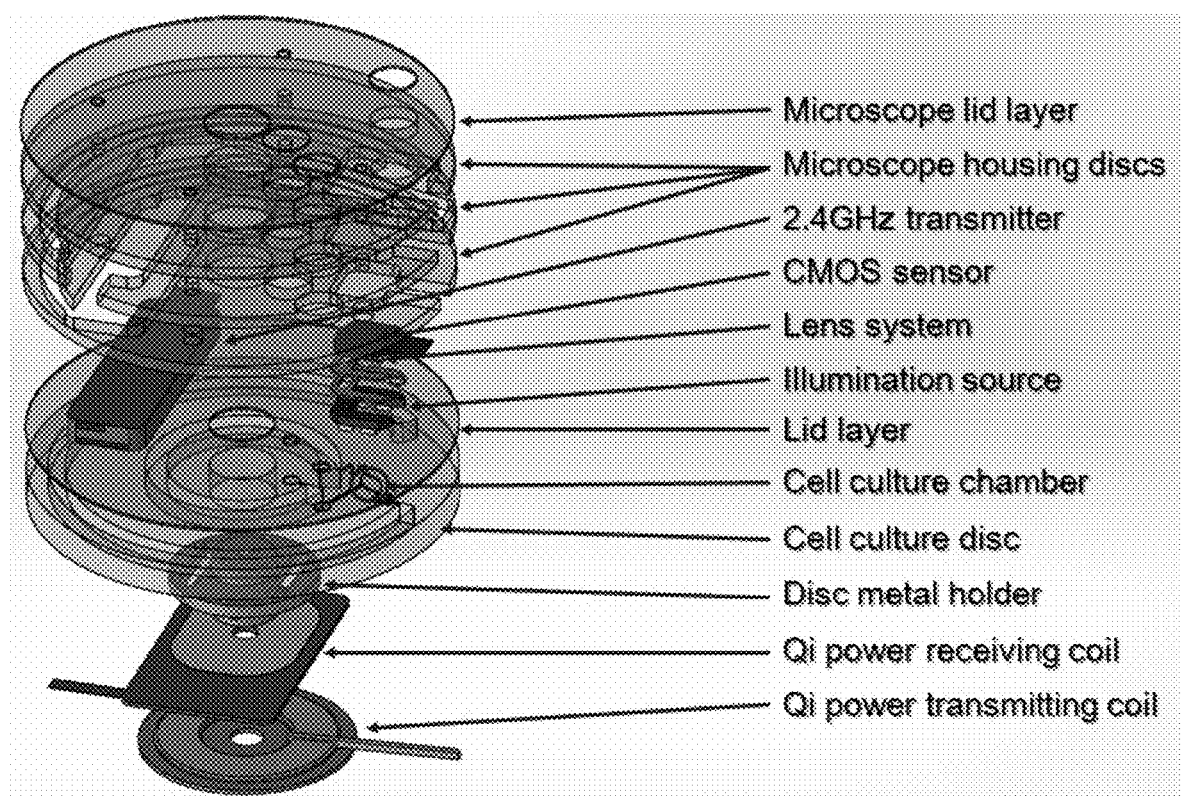
FIG. 7 is a blow-up illustration of an example the setup with integrated cell culture disc and microscope for wireless transmittal of results.

FIG. 7 is a blow-up illustration of an example the setup with integrated cell culture disc and microscope for wireless transmittal of results.

Figure 8:
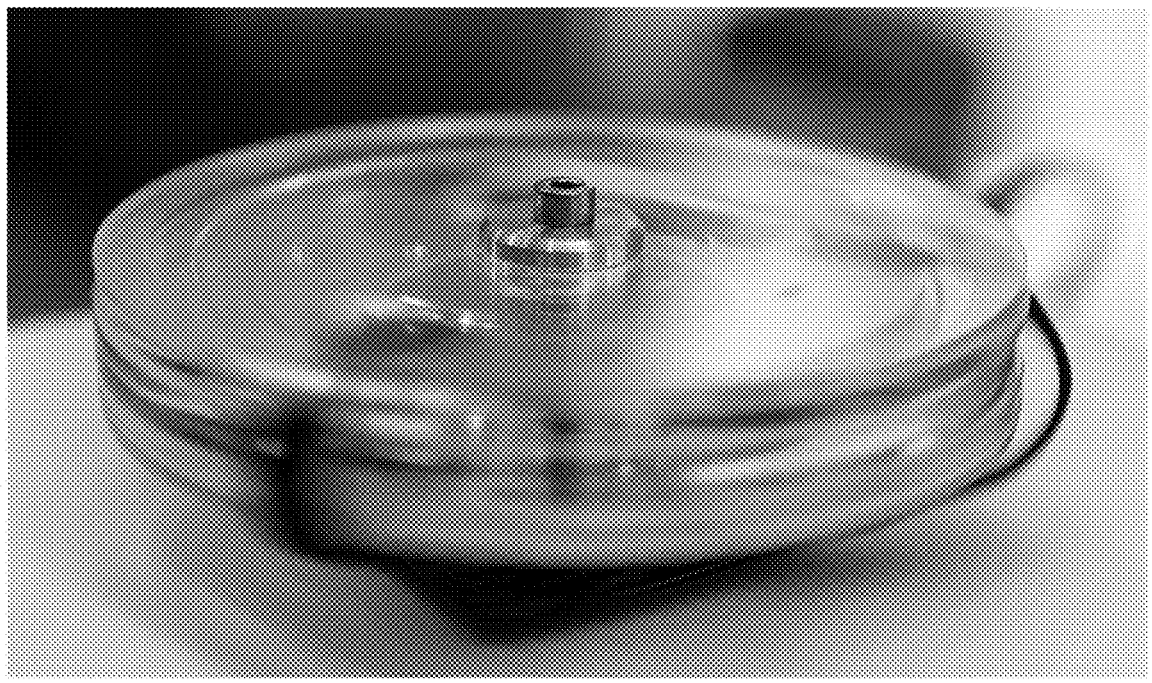
FIG. 8 is a photo of one embodiment of the presently disclosed mobile centrifugal microfluidic device where the platform is spun at 22.5~67.5 rpm (0.375~1.125 Hz) in a controlled environment.

FIG. 8 is a photo of one embodiment of the presently disclosed mobile centrifugal microfluidic device where the platform is spun at 22.5~67.5 rpm (0.375~1.125 Hz) in a controlled environment.

Figure 9:
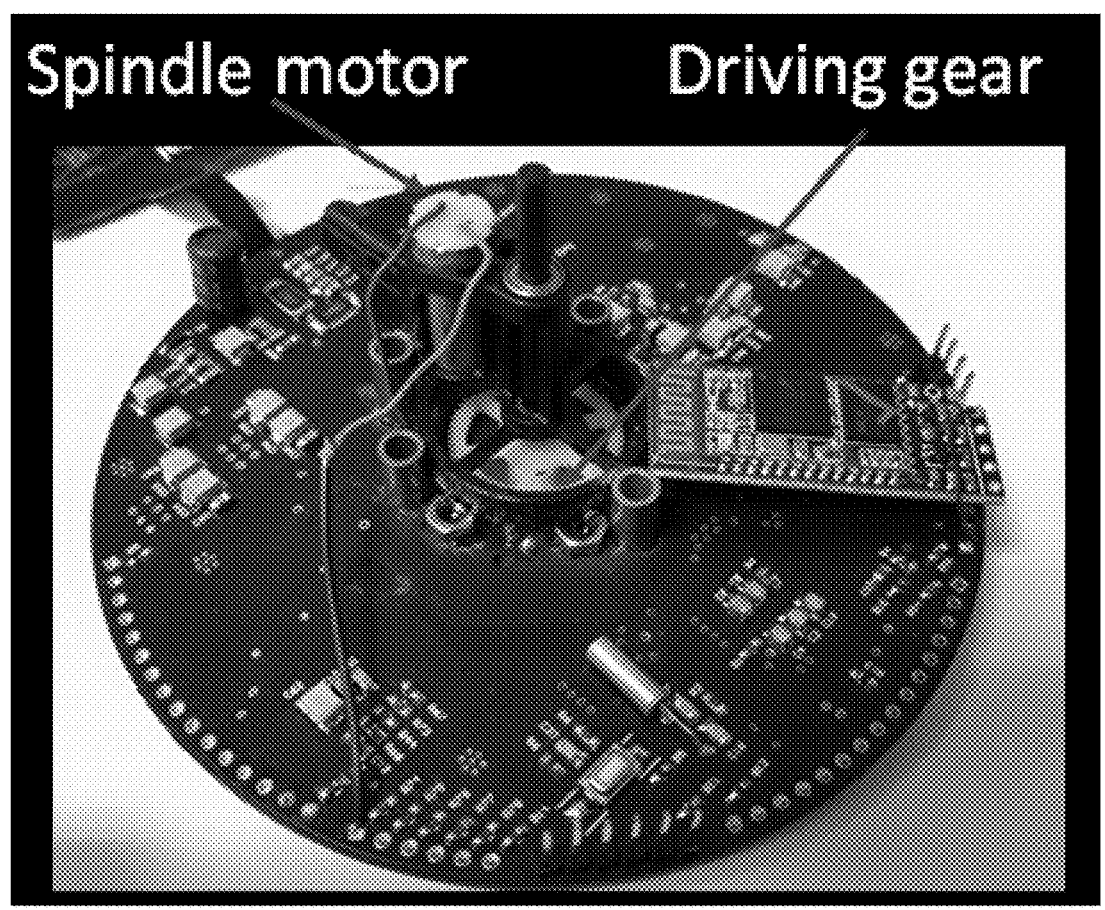
FIG. 9 shows a photo of one example of integration of a spindle motor on a rotatable platform. Gearing is provided to better utilize the torque of the spindle motor.

FIG. 9 shows a photo of one example of integration of a spindle motor on a rotatable platform. Gearing is provided to better utilize the torque of the spindle motor.

Figure 10:
FIG. 10 shows a photo of a truly mobile example of the presently disclosed centrifugal microfluidic device. It is shown rotating in a grass field and is powered by a wireless mobile charger.

FIG. 10 shows a photo of a truly mobile example of the presently disclosed centrifugal microfluidic device. It is shown rotating in a grass field and is powered by a wireless mobile charger.

Figure 11:
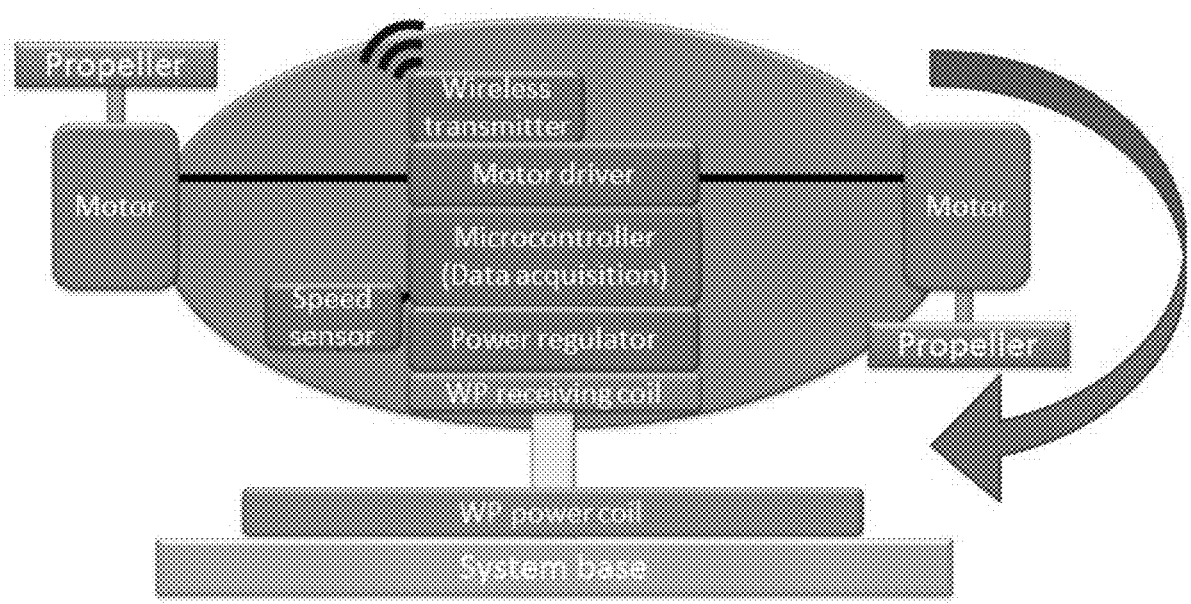
FIG. 11 shows an illustration of one embodiment of the presently disclosed mobile centrifugal microfluidic device, wherein two motors are placed at the edge of the device for generating thrust via two propellers.

FIG. 11 shows an illustration of one embodiment of the presently disclosed mobile centrifugal microfluidic device, largely corresponding to the setups in FIGS. 1 and 2, but with the notable difference that two motors are placed oppositely on the circumference of the platform, both motors provided with propellers. When the motors are powered the propellers will rotate to generate thrust that consequently will rotate the platform.

Figure 12:
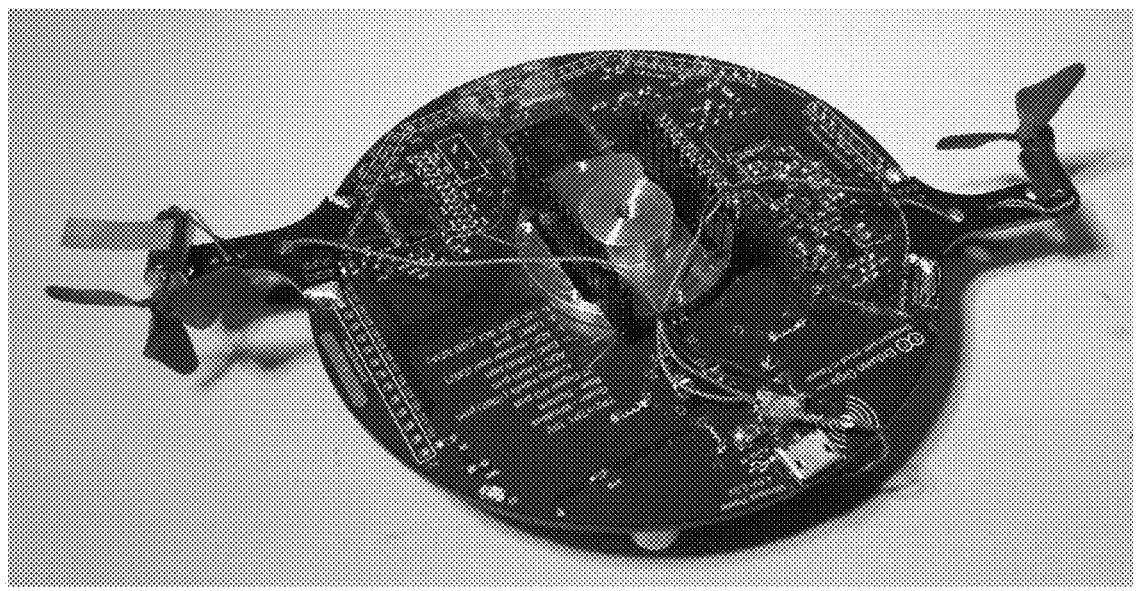
FIG. 12 shows a photo of one embodiment of the presently disclosed rotatable platform where rotation of the platform is provided by motor-propellers.

FIG. 12 shows a photo of one embodiment of the presently disclosed rotatable platform where rotation of the platform is provided by motor-propellers. Similar to FIG. 11 two motors provided with three blade propellers are placed oppositely on the circumference of the platform. When the motors are powered the propellers will rotate to generate thrust that consequently will rotate the platform.

Figure 13:
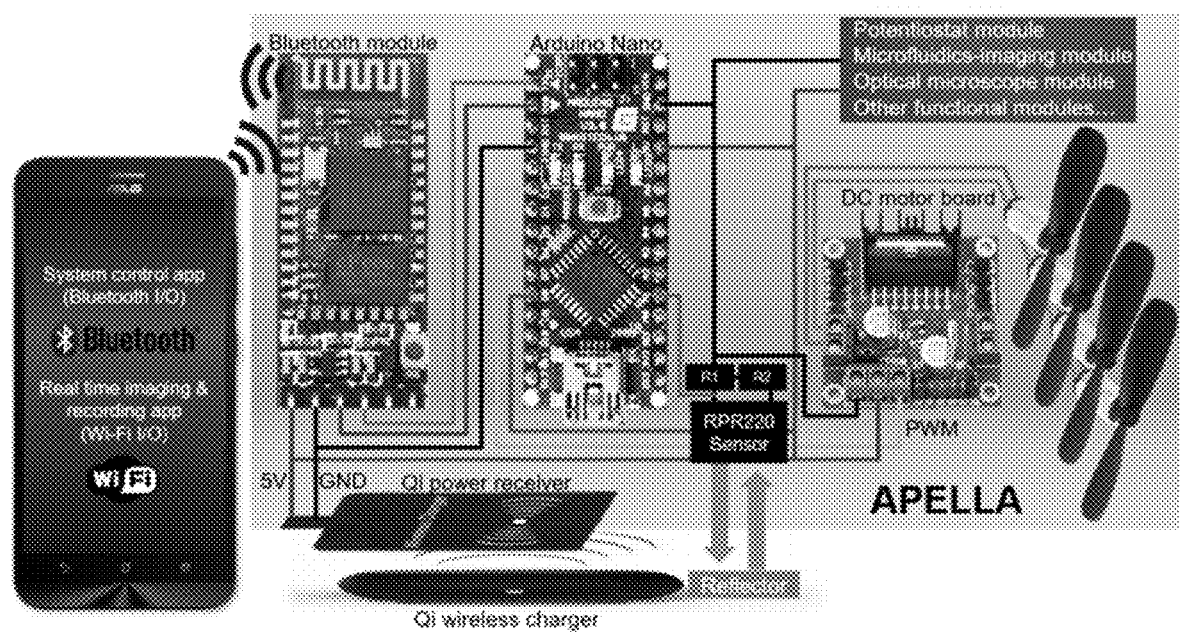
FIG. 13 shows a schematic diagram of an all-in-one powered lab-on-a-disc platform according to the present disclosure that illustrates the modularity of the platform.

FIG. 13 shows a schematic diagram of an all-in-one powered lab-on-a-disc platform according to the present disclosure. In this embodiment, the platform facilitates wireless inductive power, wireless input/output communication, a closed loop spinning mechanism, and compatibility with a number of functional modules such as a potentiostat module, a microfluidics-imaging module, and/or an optical microscope module. Such modules may form part of separate discs, which may engage with the rotatable platform. All of the above is integrated in a palm-sized portable device.

Figure 14:
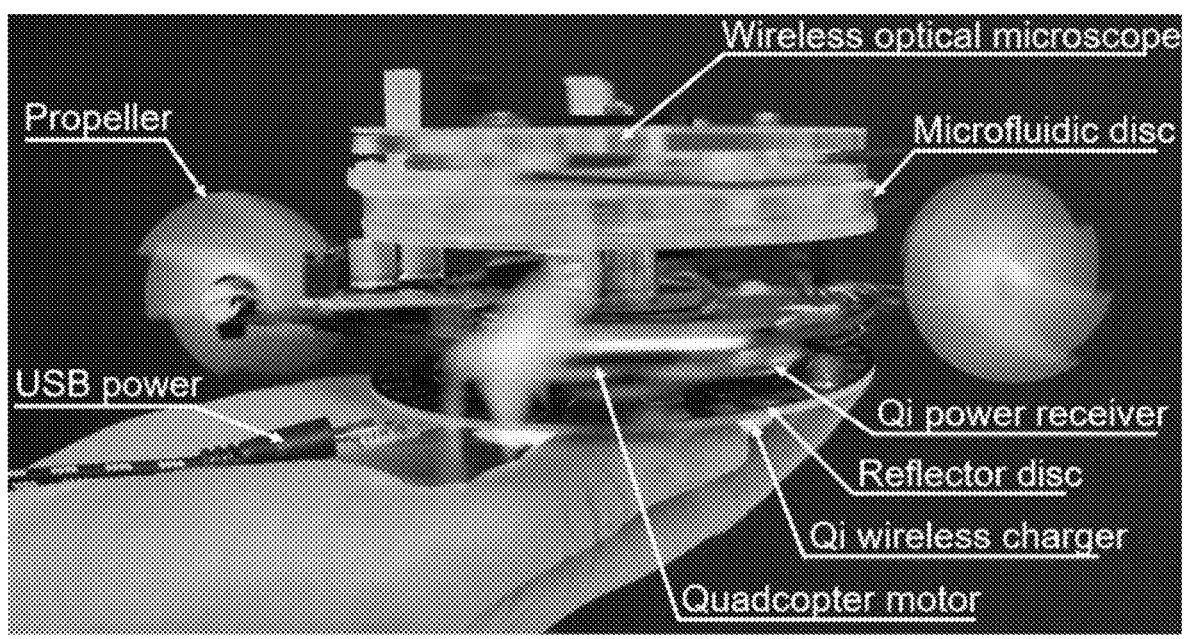
FIG. 14 shows a photo of the presently disclosed mobile lab-on-a-disc platform, where the platform is placed in the palm of a hand.

FIG. 14 shows a photo of the presently disclosed mobile lab-on-a-disc platform, where the platform is placed in the palm of a hand. This embodiment features a plurality of quadcopter motors, each motor driving a propeller. The LoD platform further comprises a Qi power receiver, a reflector disc, a microfluidic disc, and a wireless optical microscope.

Figure 15:
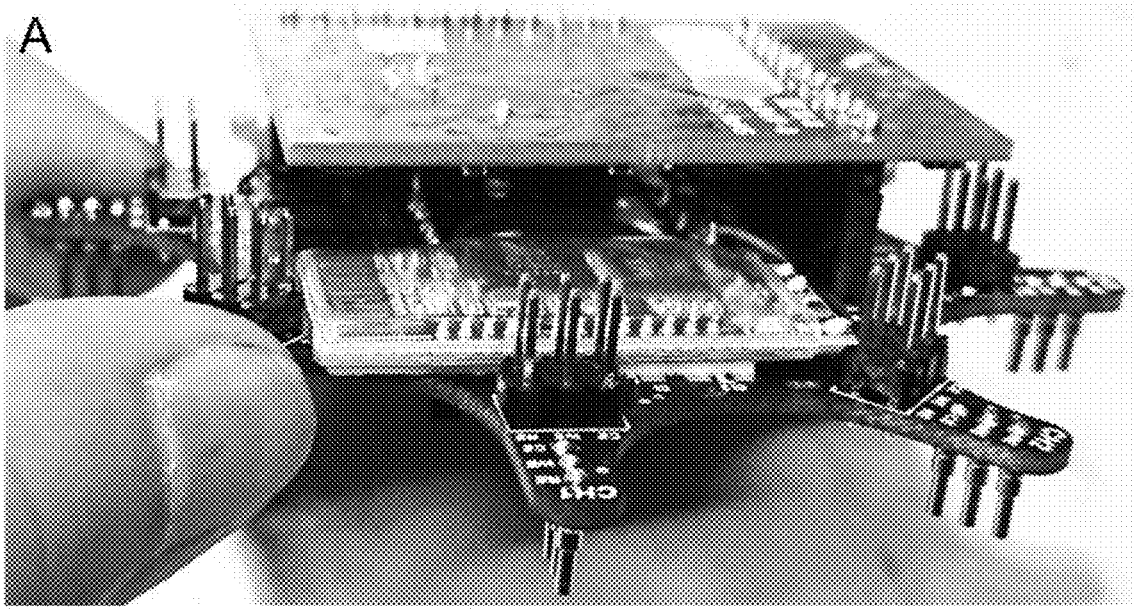
FIG. 15 shows a custom-made potentiostat module, which is compatible with the presently disclosed modular lab-on-a-disc platform.

FIG. 15 shows a sensing disc according to the present disclosure, said sensing disc being compatible with the presently disclosed lab-on-a-disc platform. The sensing disc may comprise a potentiostat module for facilitating real-time sensing of experiments performed in one or more sample chambers located in a separate microfluidic disc. In this embodiment, the sensing disc comprises a PalmSens EmStat3 module, which is a potentiostat module.

Figure 16:
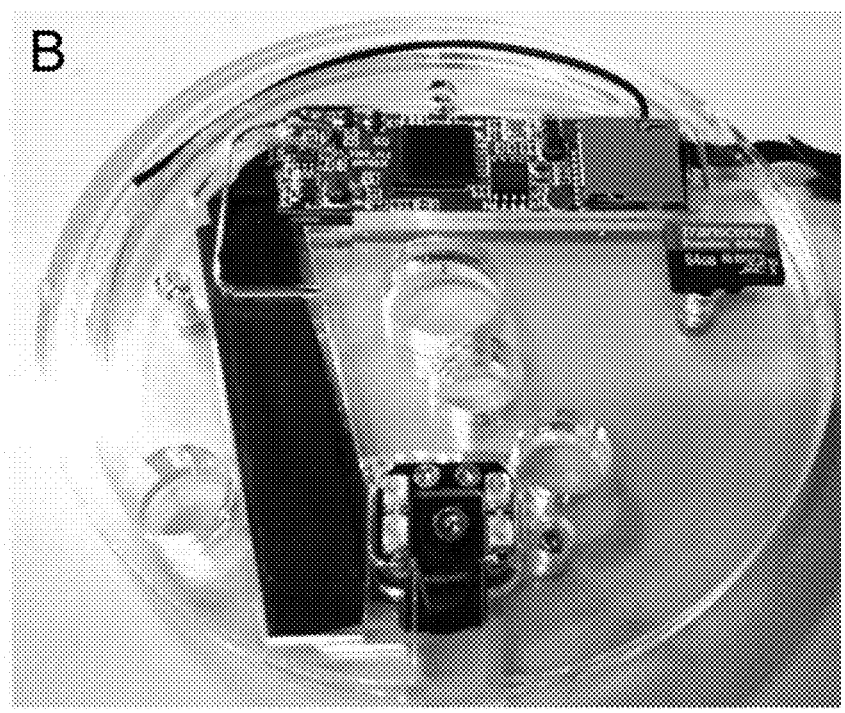
FIG. 16 shows a custom-made imaging module with integrated camera, said module being compatible with the presently disclosed lab-on-a-disc platform.

FIG. 16 shows a novel imaging disc according to the present disclosure, said imaging disc being compatible with the presently disclosed lab-on-a-disc platform. The imaging disc preferably comprises a camera for imaging centrifugal microfluidic experiments. The camera is preferably a small camera such as a spy camera or a mini camcorder. The imaging disc and/or the camera preferably comprises means for transmitting real-time images from the camera, e.g. to a smartphone or similar via Wi-Fi communication or Bluetooth communication.

Figure 17:
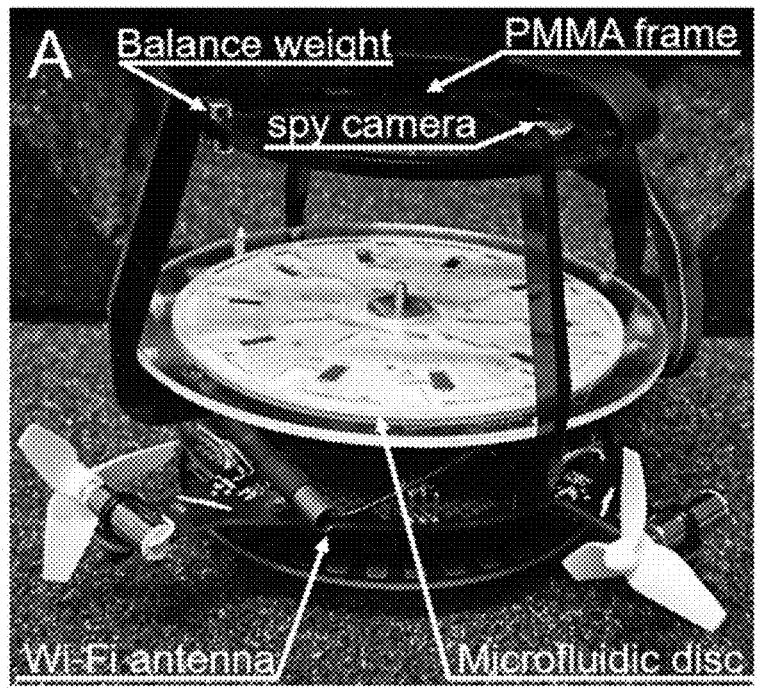
FIG. 17 shows an embodiment of the presently disclosed mobile lab-on-a-disc platform. In this embodiment, the platform combines a microfluidic disc and an imaging module.

FIG. 17 shows an embodiment of the presently disclosed mobile lab-on-a-disc platform. In this embodiment, the platform combines a microfluidic disc and an imaging module, the microfluidic disc comprising one or more sample chambers and/or microcontainers for centrifugal microfluidic experiments, and the imaging module comprising a spy camera for imaging said experiments. The platform further comprises a plurality of motors, each motor driving a propeller, at least one balance weight, and a Wi-Fi antenna for wireless communication and/or transmittal of data.

Figure 18:
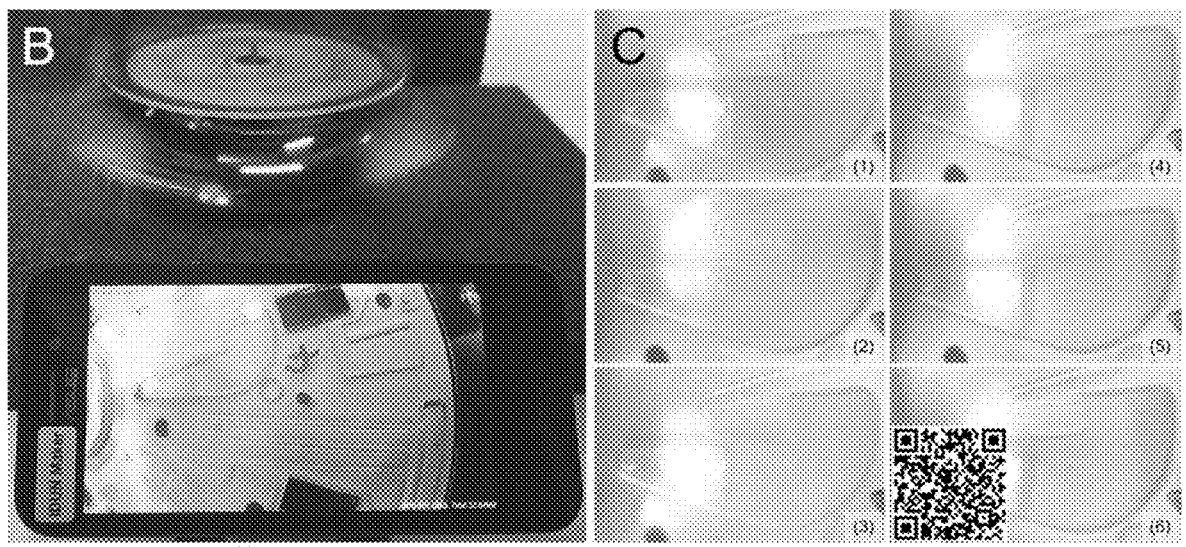
FIG. 18B shows the lab-on-a-disc platform of FIG. 17 while spinning. The imaging module is integrated in the platform such that it spins together with the platform.
FIG. 18C shows a series of images from an experiment showing yeast cell sedimentation in the microfluidic disc.

FIG. 18B shows the lab-on-a-disc platform of FIG. 17 while spinning. The imaging module is integrated in the platform such that it spins together with the platform and allows the transmission of real-time images to an electronic device, e.g. a smartphone, via Wi-Fi communication. In this example, the imaging module comprises a spy camera capable of acquiring Full HD (1920×1080 pixels) images and/or high temporal resolution video (30 frames per second).

FIG. 18C shows a series of images from an experiment showing yeast cell sedimentation in the microfluidic disc. The images were obtained with the mobile lab-on-a-disc platform shown in FIG. 17 and FIG. 18B.

FIG. 19 shows a schematic of a microfluidic disc constituting a cell culture disc. The disc is configured for engaging with a rotatable platform via the central opening in the disc. It may be used with the presently disclosed lab-on-a-disc platform or alternatively with an external motor for spinning the platform. The cell culture disc preferably comprises an inlet reservoir, an outlet reservoir, an inlet channel, an inoculation channel, an effluent channel, and a culture chamber for culturing microorganisms, e.g. bacteria or mammalian cells.

FIG. 20 shows a schematic of how the cell culture disc according to the present disclosure may be assembled from multiple layers to form a microfluidic disc enclosing several channels. In this embodiment, the cell culture disc is formed from alternating layers of Poly(methyl methacrylate) (PMMA) and pressure-sensitive adhesive (PSA). The structures in the layers may be manufactured using a combination of micro milling (e.g. for the smaller channels) and laser cutting (e.g. for the larger channels). This particular embodiment is suited for studying bacterial biofilms, said biofilm growing in the top of the culture chamber. This biofilm preferably forms on the lid of the culture chamber.

Figure 21:
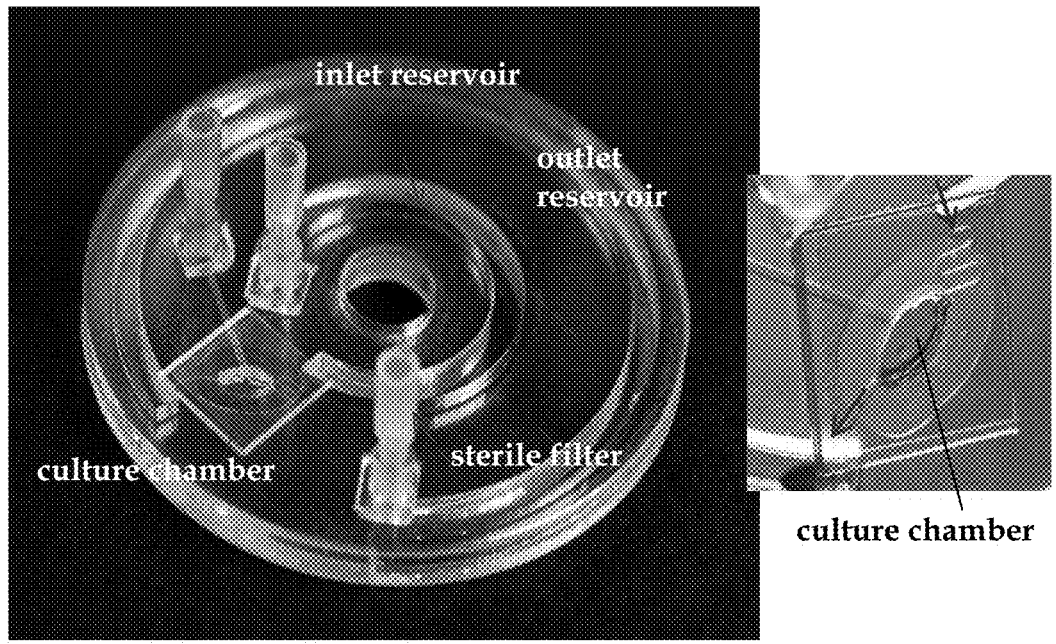
FIG. 21 shows a picture of a cell culture disc according to the present disclosure.

FIG. 21 shows a picture of a cell culture disc according to the present disclosure. The disc comprises three openings, each of said openings configured for engaging with either: a) a syringe for introducing or removing liquid, or b) a filter for filtering air introduced into the reservoirs and for allowing the liquid to flow. In this picture, the disc is shown with filters attached to the openings, which is the typical configuration for performing experiments inside the disc. The small insert to the right is a close-up of the culture chamber. The arrows indicate the direction of the flow.

FIG. 22 shows the cell culture disc as part of an experimental setup placed in a bacterial culture room at 37° C. The disc engages with a rotatable platform, which is rotated by a spinning motor. This setup allows for centrifugal experiments to be carried out, wherein the disc is rotated at a constant speed. The features on the disc, e.g. the serpentine channel between the inlet reservoir and the culture chamber, ensures a steady flow speed across e.g. a biofilm in the culture chamber. Notice that no tubings or external pumps are necessary in the setup.

FIG. 23 shows two cell culture discs according to the present disclosure, wherein the discs are stacked upon each other for increased throughput. The stacking of multiple discs enables separate experiments to be conducted simultaneously. In this embodiment, only two discs are stacked, but the modular system can be extended to incorporate more discs than two. Similarly, the pictured sterile filters are quite tall compared to the disc and they may be replaced by filters of a smaller height.

FIG. 24 shows a modular lab-on-a-disc platform according to the present disclosure, wherein the platform comprises a cell culture disc according to the present disclosure, an optical microscope integrated on the platform, wireless power generation, wireless communication, and a spinning motor. The integrated microscope enables wireless optical imaging of experiments performed inside the culture chamber.

Figure 25:
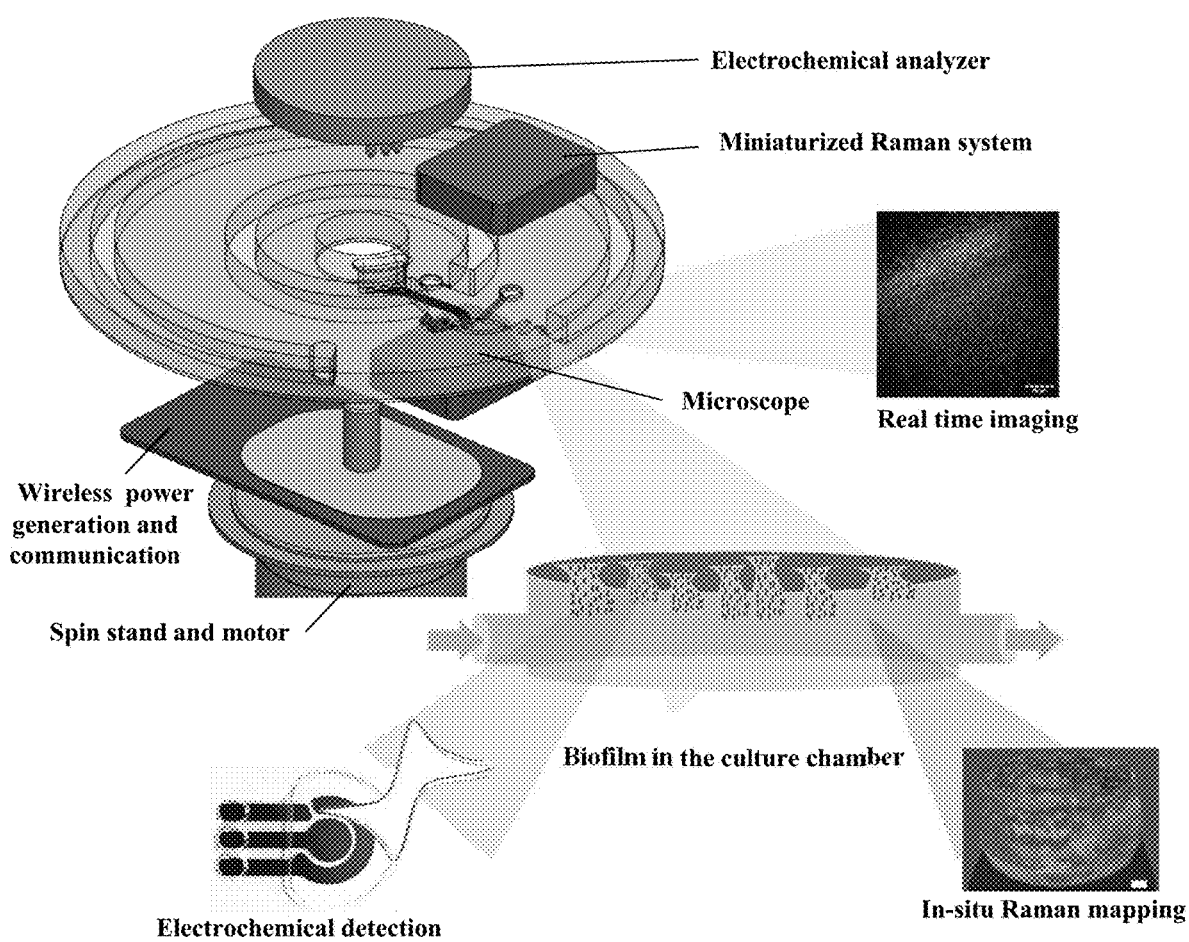
FIG. 25 shows a modular lab-on-a-disc platform similar to the one showed in FIG. 24, except this platform illustrates the interfacing with miniaturized electrochemical analyzer (e.g. potentiostat) and portable Raman system and microscope, facilitating real-time sensing in the culture chamber.

FIG. 25 shows a modular lab-on-a-disc platform similar to the one showed in FIG. 24, except this platform is configured for interfacing with miniaturized electrochemical analyzer (e.g. potentiostat) and portable Raman system and microscope, facilitating real-time sensing in the culture chamber. This is achieved by integrating an electrochemical analyzer on the platform. The platform may further comprise a miniaturized Raman system for conducting in-situ Raman mapping.

Figure 26:
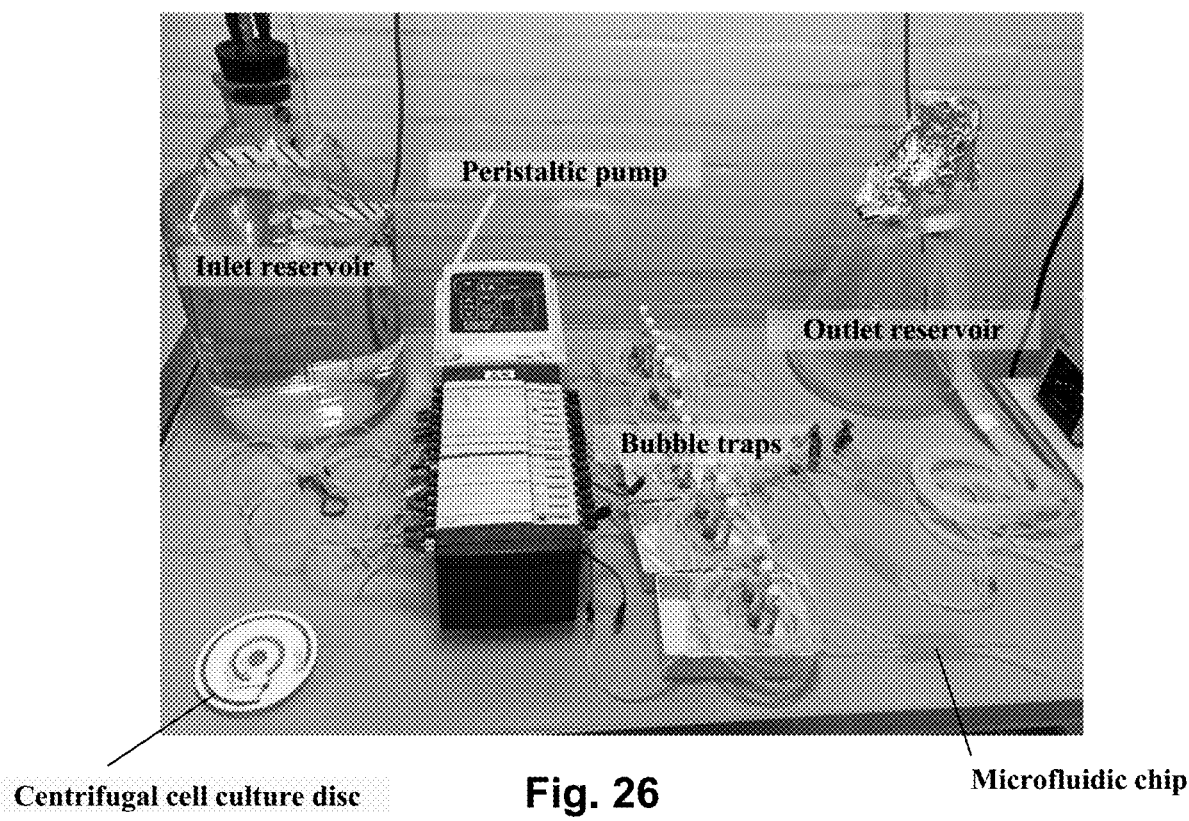
FIG. 26 shows an experimental setup for bacterial culture and studying biofilm formation and antibiotic resistance according to prior art. The centrifugal cell culture disc is placed in the lower left corner for comparison.

FIG. 26 shows an experimental setup for studying biofilm formation and antibiotic resistance according to prior art. The centrifugal cell culture disc is placed in the lower left corner for comparison. The cell culture disc integrates some of the components of the large setup (e.g. the inlet and outlet reservoir) and obviates the need for other components entirely (e.g. the peristalic pump, tubings, etc.). Thus, the cell culture disc provides a much simpler platform for conducting microfluidic experiments without the use of tubings and pumps.

Figure 27:
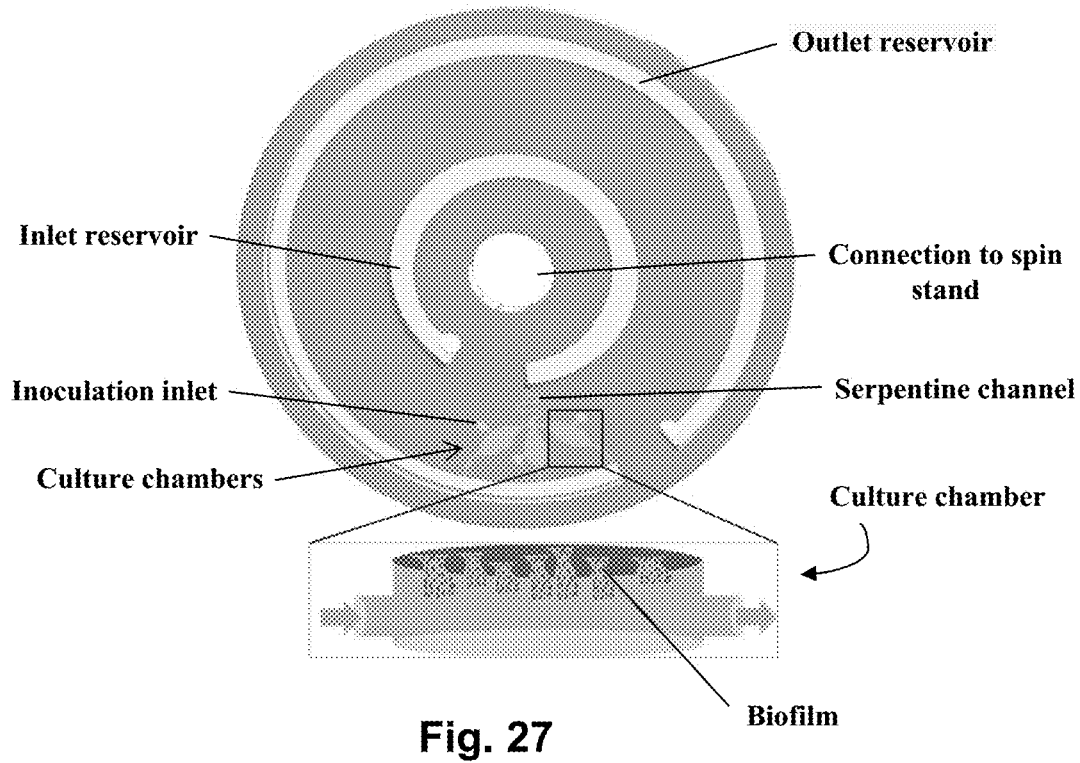
FIG. 27 shows a schematic of a cell culture disc according to the present disclosure, wherein the disc comprises a plurality of culture chambers, here depicted with three chambers.

FIG. 27 shows a schematic of a cell culture disc according to the present disclosure, wherein the disc comprises a plurality of culture chambers, here depicted with three chambers. The serpentine channel splits into multiple branches (here three), each of which serves as the inlet to a culture chamber. The integration of multiple culture chambers on the same disc allows for multiple experiments to be conducted simultaneously. The insert shows a close-up of one of the culture chambers, wherein a biofilm has formed.

Figure 28:
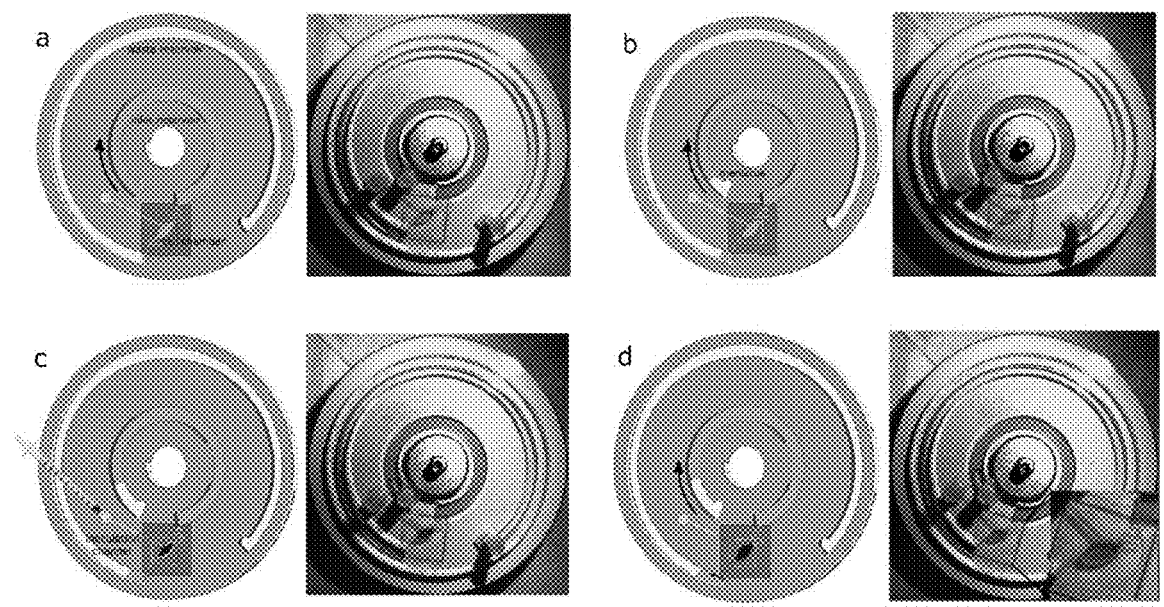
FIG. 28 shows a series of drawings and corresponding pictures of the operation the cell culture disc, including priming of the cell culture chamber at 2 Hz (a) meniscus formation and stabilization of flow at 0.63 Hz (0.3 µl/min) or 0.70 Hz (1 µl/min) Hz (b). Addition of bacteria in the cell chamber in static (c) and start flow for long term culture (d).

FIG. 28 shows a series of drawings and corresponding pictures of the operation of the cell culture disc. Initially, the inlet reservoir is filled with a liquid, e.g. a liquid medium comprising nutrients for bacteria. Then, typically, the platform is spun at a low rotational speed until a meniscus forms, said meniscus travelling with a certain speed. The platform may then be stopped and the sample chamber may be inoculated, e.g. using an injection needle inserted through the inoculation channel. The lab-on-a-disc may be spun again to study e.g. cell growth in the sample chamber during the presence of liquid flow through the chamber. The individual steps show the following: (a) priming of the cell culture chamber at 2 Hz, (b) meniscus formation and stabilization of flow at 0.63 Hz (0.3 µl/min) or 0.70 Hz (1 µl/min) Hz, (c) addition of bacteria in the cell chamber in static mode, and (d) resuming the flow for long term culturing of cells.

FIG. 29 shows schematically, in close-up and in cross-section, a culture chamber of the microfluidic platform according to an embodiment of the present disclosure. The culture chamber comprises an inlet channel in fluid communication with the inlet reservoir and an outlet channel in fluid communication with the outlet reservoir of the cell culture disc. The disc itself comprises multiple stacked layers of PSA (adhesive) and PMMA. The culture chamber is preferably closed with a lid such as a cover glass. In this embodiment, the culture chamber is suitable for studying the growth of bacterial cells, which is illustrated by the formation of a biofilm on the cover glass.

FIG. 30 shows a picture of the centrifugal microfluidic platform placed on a rotatable platform. The picture shows an example of how the inoculation of the sample chamber (the inoculum being e.g. cells, bacteria or real patient samples) can be carried out. A syringe needle may preferably be inserted through the inoculation inlet and through the inoculation channel in order for the distal end of the needle to reach the sample chamber. A couple of other features are present in the figure such as a Luer connector and a filter connected to the Luer connector. The Luer connector may be fitted to the opening of the inlet reservoir.

Figure 31:
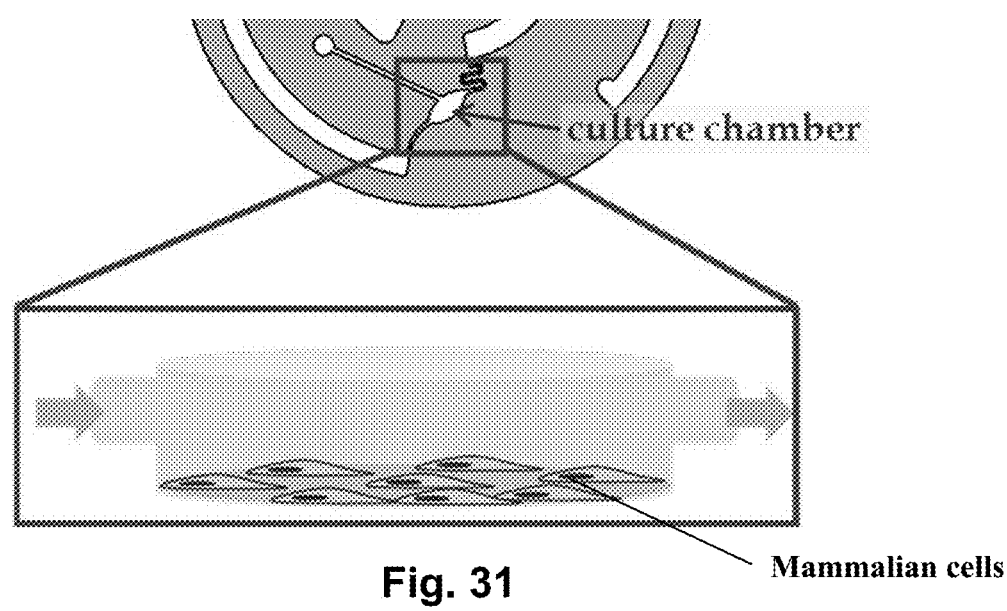
FIG. 31 shows a schematic of a close-up of a mammalian culture chamber, where cells are adhering on the bottom of the culture chamber in the centrifugal microfluidic platform.

FIG. 31 shows a schematic of a close-up of a culture chamber on the centrifugal microfluidic platform, where mammalian cells are adhering to the bottom of the culture chamber. The applicant has found that the culture chamber is suitable for growing mammalian cells on the bottom of the cell chamber. This is different from a bacterial biofilm, which prefers to grow on a lid or cover glass in the top of the chamber, cf. FIG. 29. In case of mammalian cell growth, a precise control of the flow rate in the sample chamber is very important, which is possible with the presently disclosed microfluidic platform.

FIG. 32 shows a calibration curve that provides a relation between the rotational frequency of the platform and the corresponding achieved flow rate in the inlet reservoir. The data were obtained by gradually increasing the rotational frequency from 0.50 Hz to 1 Hz while measuring the volume of the liquid at a specific time. The calibration curve was constructed from the images taken of the inlet reservoir at a defined time (depending on the frequency). It is observed that the flow rate versus frequency is approximately linear on a limited interval (here 0.5-0.8 Hz).

Figure 33:
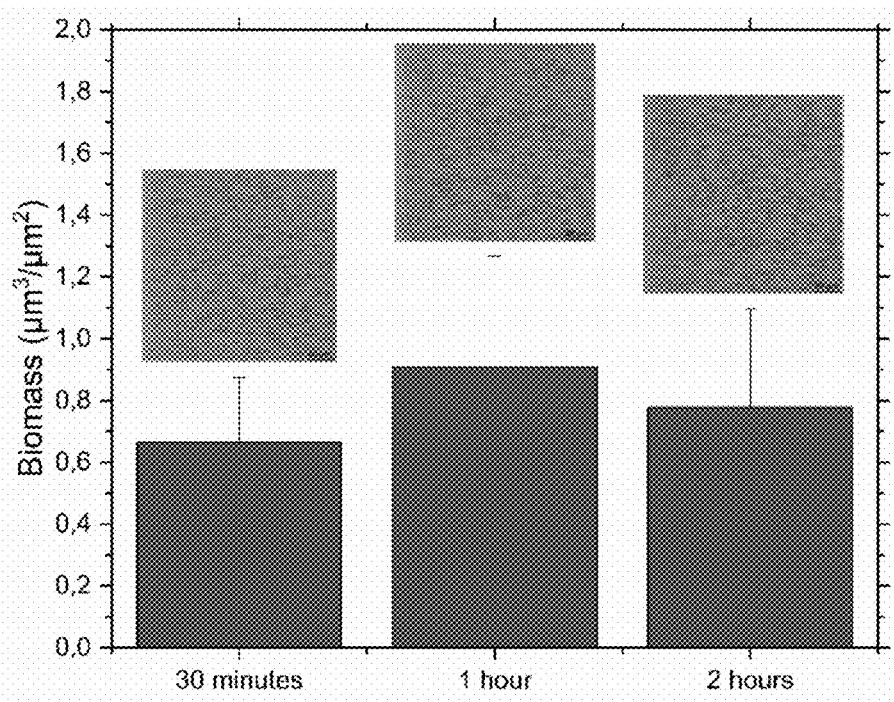
FIG. 33 shows data from an experiment using the presently disclosed microfluidic platform wherein it was studied how the length of the stop flow condition affects the amount of attached bacteria, expressed in biomass.

FIG. 33 shows data from an experiment using the presently disclosed microfluidic platform. In this experiment, it was studied how the length of the stop flow condition affects the amount of attached bacteria, expressed in biomass. The bacteria were kept in a static condition after inoculation, in order to facilitate the adhesion of the bacteria to the surface. Three different adhesion times were studied: 30 minutes, 1 hour and 2 hours. It was found that 1 hour adhesion time resulted in an increase in biomass, whereas when the bacteria were kept in a static condition for 2 hours it resulted in a decrease in biomass.

Figure 34:
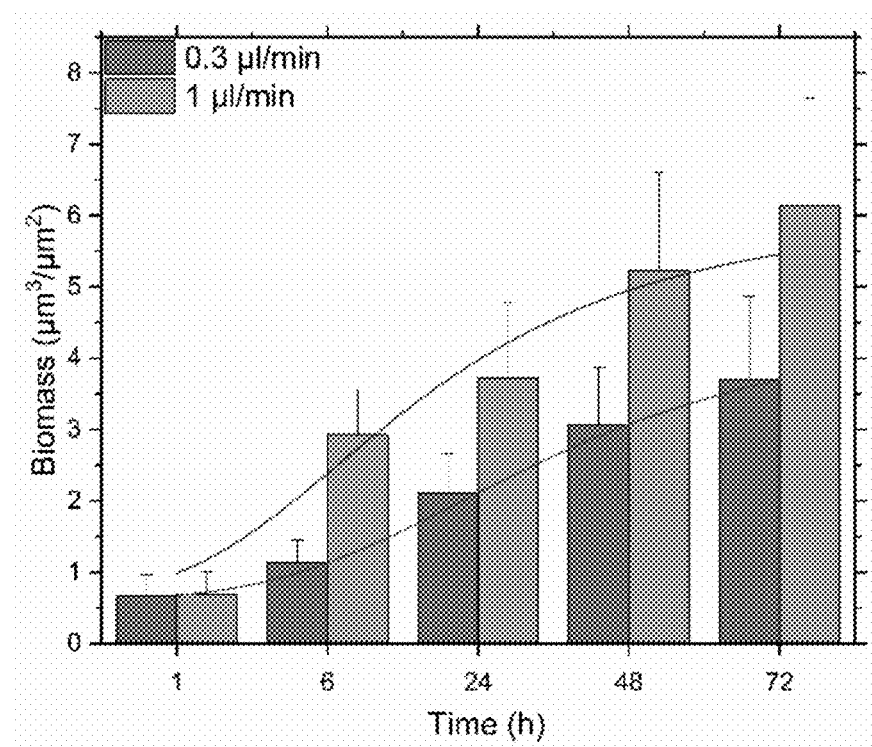
FIG. 34 shows data from an experiment using the presently disclosed microfluidic platform. The chart shows the biomass growth as function of time at 0.3 µL/min and 1 µL/min flow rate.

FIG. 34 shows data from an experiment using the presently disclosed microfluidic platform. The chart shows the biomass growth as function of time at 0.3 µL/min and 1 µL/min flow rate. In this experiment, it was studied how the nutrient composition and the rate of nutrient and oxygen delivery affect the rate of bacterial growth and biofilm formation. It has been shown that the flow rate has an effect on bacterial growth; therefore, two different flow rates were evaluated: 0.3 µL/min as the low flow rate and 1 µL/min as the high flow rate. The biofilm under investigation was a *P. aeruginosa* biofilm. It is well known that the bacteria start to grow exponentially until they reach a stationary phase, after this stage they start to die since nutrients become less available. Therefore, the biomass was determined at 1, 6, 24, 48, and 72 hours after inoculation, in order to represent the exponential growth. The first hour was in static while the others were in perfusion.

Figure 35:
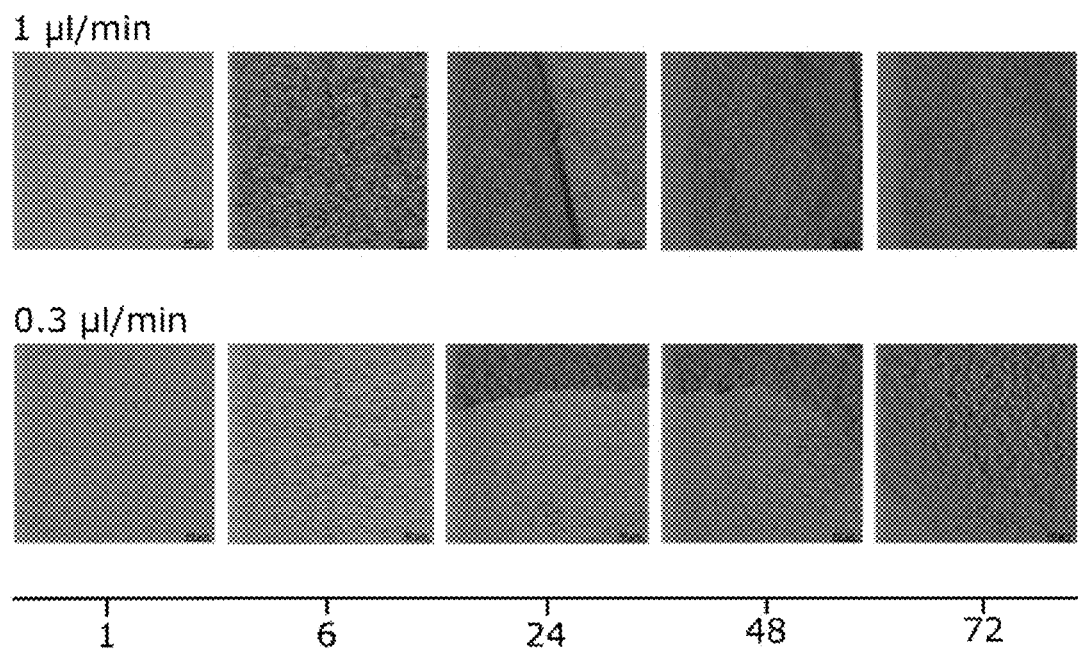
FIG. 35 shows representative images of bacteria growth obtained with a confocal microscope at different times at the same location in the cell chamber.

FIG. 35 shows representative images of bacteria growth obtained with a confocal microscope at different times at the same location in the cell chamber. The images were obtained as part of the experiment shown in FIG. 34 and with the same time stamps. It was observed that at 1 µL/min, the bacteria divided and grew faster compared to 0.3 µL/min, which could be due to the faster amount of delivered oxygen and nutrients. After 6 hours, the biomass was 1.2 µm$^3$/µm$^2$ at 0.3 µL/min and almost three times more at high flow rate. With 1 µL/min flow rate, already at 24 hours, it was possible to observe a thick biofilm in some part of the cell chamber, which reached its mature stage after 48 hours. The biofilm created at the low flow rate was uniform after 72 hours.

Figure 36:
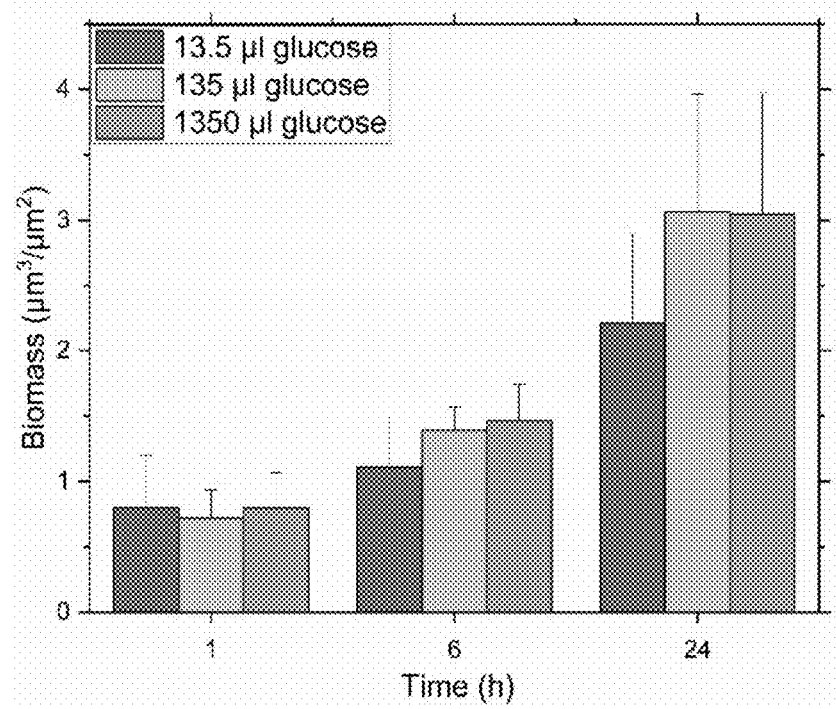
FIG. 36 shows data from an experiment using the presently disclosed microfluidic platform. The chart shows changes in biomass and bacteria growth when the bacteria was cultured using 1 time, 10 times and 100 times increased glucose concentration.

FIG. 36 shows data from an experiment using the presently disclosed microfluidic platform. The chart shows changes in biomass and bacteria growth when the bacteria was cultured using 1 time, 10 times and 100 times increased glucose concentration. In this experiment, it was studied how the amount of glucose affects the biofilm growth at the beginning of its exponential growth up to 24 hours. While the flow rate was maintained at 0.3 µL/min we assessed the effect of 10 (135 µL) and 100 (1350 µL) times increase glucose concentration in the culture medium in comparison with the commonly used 1 time glucose concentration.

Figure 37:
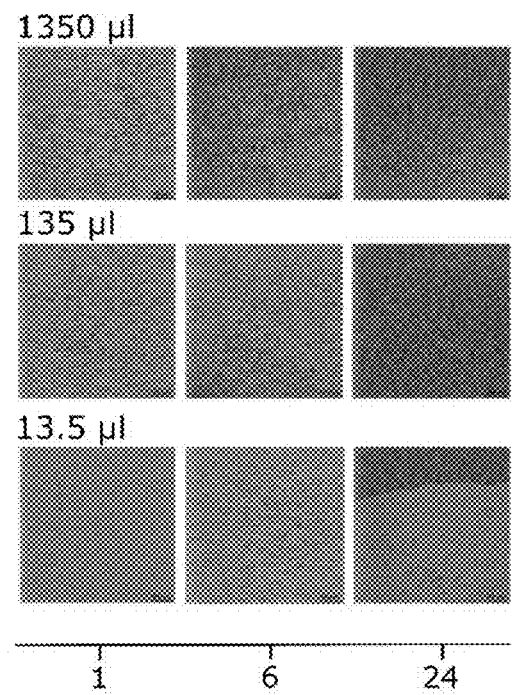
FIG. 37 shows representative images of bacteria growth obtained with a confocal microscope at different times at the same location in the cell chamber.

FIG. 37 shows representative images of bacteria growth obtained with a confocal microscope at different times at the same location in the cell chamber. The images were obtained as part of the experiment shown in FIG. 36 and with the same time stamps.

Figure 38:
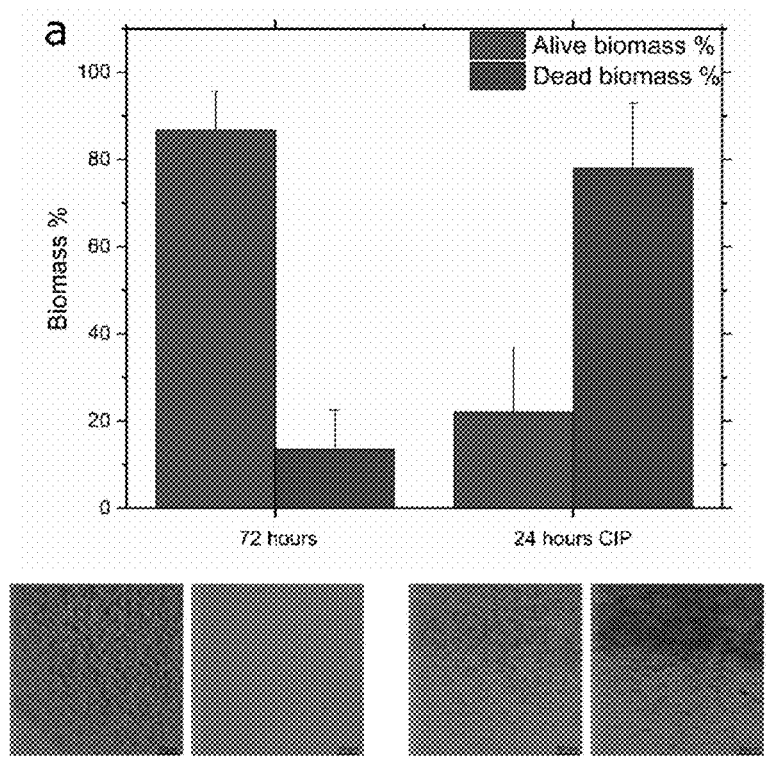
FIG. 38 shows the biomass of dead and alive bacteria at 72 hours and after 24 hours of antibiotic treatment at a flow rate of 0.3 µL/min.

FIG. 38 shows the biomass of dead and alive bacteria at 72 hours and after 24 hours of antibiotic treatment at a flow rate of 0.3 µL/min. The bottom images are corresponding confocal images, where live cells are in light grey and the dead biomass in dark grey. Before treatment, almost all (80%-90%) the bacteria were alive, however after 24 hours of antibiotic perfusion around 70% of the bacteria were dead.

Figure 39:
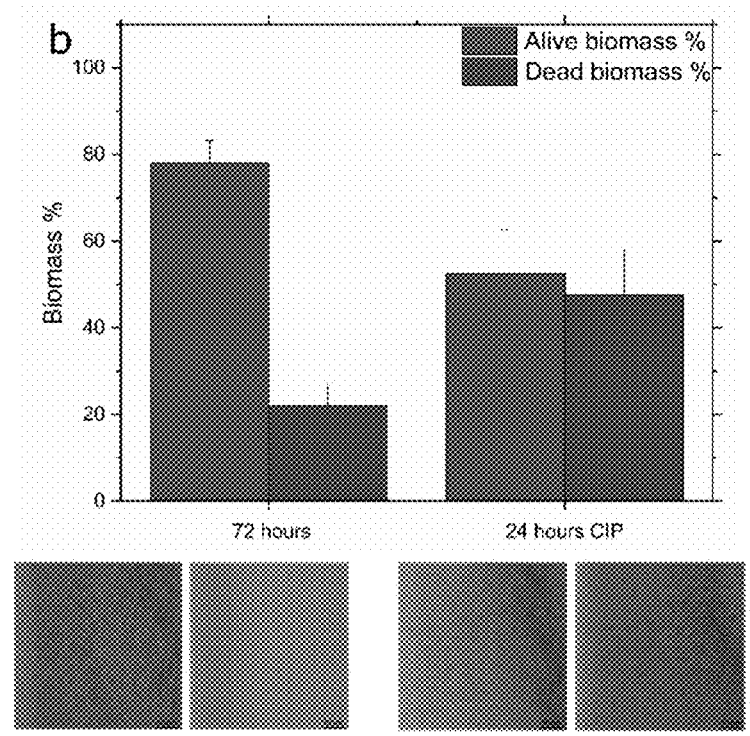
FIG. 39 shows the biomass of dead and alive bacteria at 72 hours and after 24 hours of antibiotic treatment at a flow rate of 1 µL/min.

FIG. 39 shows the biomass of dead and alive bacteria at 72 hours and after 24 hours of antibiotic treatment at a flow rate of 1 µL/min. The bottom images are corresponding confocal images, where live cells are in light grey and the dead biomass in dark grey. Before treatment, almost all (80%-90%) the bacteria were alive, however after 24 hours of antibiotic perfusion around 50% of the bacteria were dead.

FIG. 40 shows an exploded view of an embodiment of the centrifugal microfluidic platform according to the present disclosure. This embodiment is suitable for growing mammalian cells in the cell chamber. It features alternating layers of PMMA and PSA, however the platform may also be manufactured using other techniques such as injection moulding.

FIG. 41 shows a schematic of an embodiment of the centrifugal microfluidic platform according to the present disclosure. This embodiment is suitable for growing mammalian cells in the cell chamber. Notice that it does not feature the lid shown in FIG. 19. A cross-sectional view of the disc can be seen in FIG. 43.

FIG. 42a shows a picture showing an experimental setup, wherein the centrifugal microfluidic platform was used to grow mammalian cells under the influence of flow. The platform is here placed in an incubator to precisely control the temperature and gas composition as well as the humidity of the environment of the microfluidic platform.

FIGS. 42b and 42c show images of the mammalian cells contained in the cell chamber. The images were taken as part of the experiment shown in FIG. 42a. They show Caco-2 cells in the cell chamber at b) 2 hours after seeding and c) after 7 days.

FIG. 43 shows schematically, in close-up and in cross-section, a mammalian culture chamber according to an embodiment of the presently disclosed microfluidic platform. Notice that the culture chamber is configured such that the mammalian cells are adhering to the bottom of the culture chamber.

Figure 44:
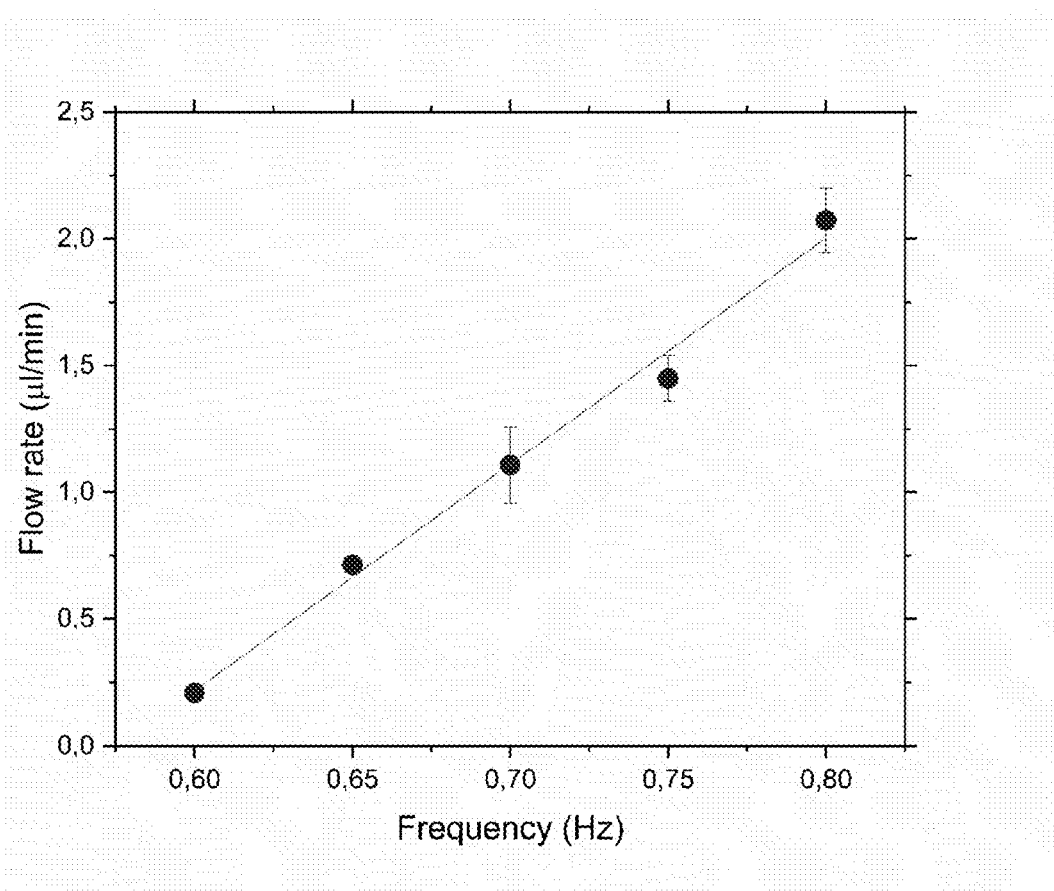
FIG. 44 shows the linear part of the calibration curve shown in FIG. 32 providing a relation between the rotational frequency of the platform and the corresponding achieved flow rate through the culture chamber. Thus, the linear regime can be used to precisely control the flow rate through the culture chamber. The variation in the flow rate between different microfluidic platforms was around 10%, based on 3 different tested platforms. The variation of the flow rate over time for up to 72 hours was around 5%, which means that it is possible to achieve a good and precise control over the flow rate over time.

FIG. 44 shows the linear part of the calibration curve shown in FIG. 32 providing a relation between the rotational frequency of the platform and the corresponding achieved flow rate through the culture chamber. Thus, the linear regime can be used to precisely control the flow rate through the culture chamber. The variation in the flow rate between different microfluidic platforms was around 10%, based on 3 different tested platforms. The variation of the flow rate over time for up to 72 hours was around 5%, which means that it is possible to achieve a good and precise control over the flow rate over time. The increased flow rate occurs due to an increased centrifugal force for higher rotational frequencies of the platform.

Figure 45:
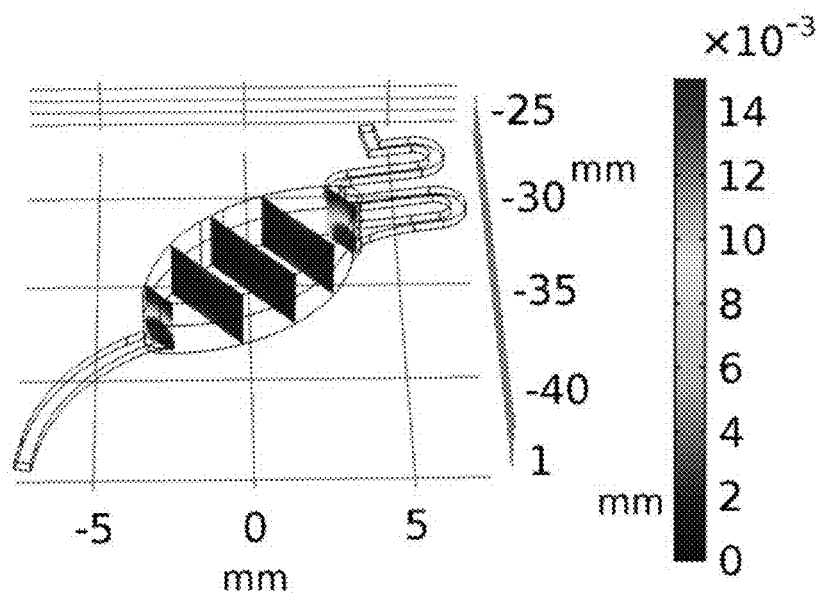
FIG. 45 shows a simulation of the shear rate in the culture chamber at 0.3 µL/min. The shear rate does not negatively affect the cell growth.

FIG. 45 shows a simulation of the shear rate in the culture chamber at 0.3 µL/min. The shear rate does not negatively affect the cell growth.

Figure 46:
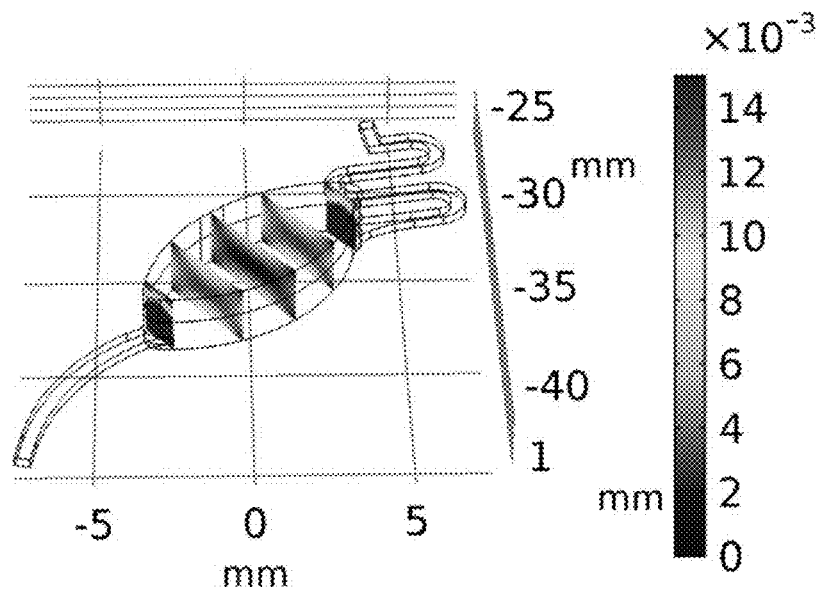
FIG. 46 shows a simulation of the shear rate in the culture chamber at 1 µL/min. The shear rate does not negatively affect the cell growth.

FIG. 46 shows a simulation of the shear rate in the culture chamber at 1 µL/min. The shear rate does not negatively affect the cell growth.

Figure 47:
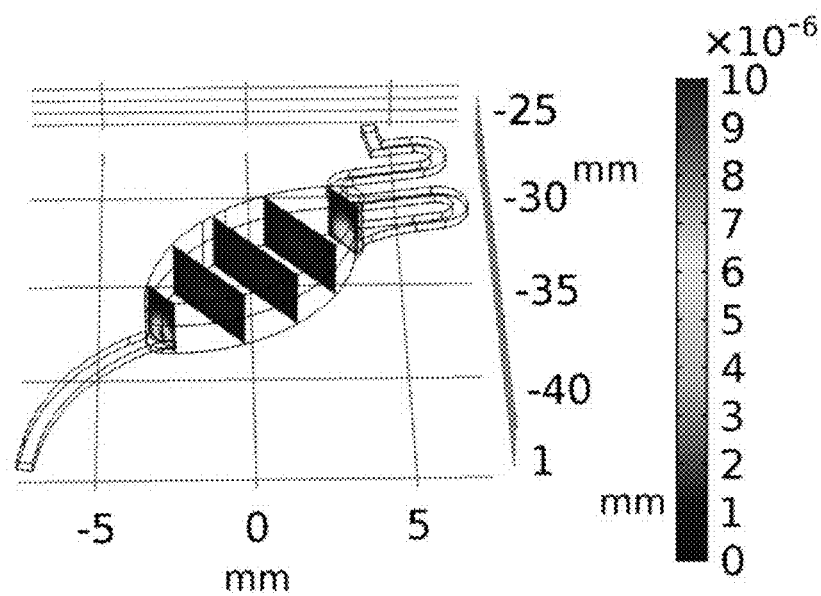
FIG. 47 shows a simulation of the flow velocity in the culture chamber at 0.3 µL/min. The flow velocity does not negatively affect the cell growth.

FIG. 47 shows a simulation of the flow velocity in the culture chamber at 0.3 µL/min. The flow velocity does not negatively affect the cell growth.

Figure 48:
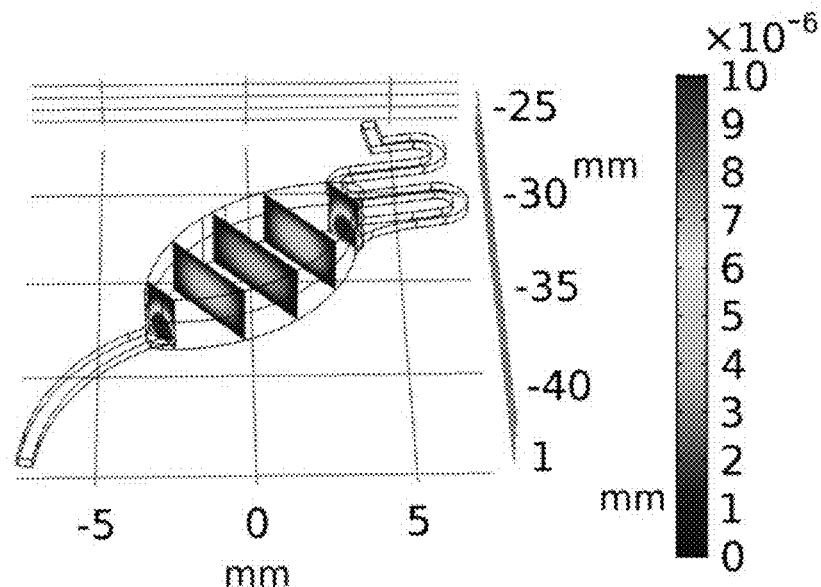
FIG. 48 shows a simulation of the flow velocity in the culture chamber at 0.3 µL/min. The flow velocity does not negatively affect the cell growth.

FIG. 48 shows a simulation of the flow velocity in the culture chamber at 0.3 µL/min. The flow velocity does not negatively affect the cell growth.

As stated previously the present disclosure further relates to a method for monitoring microorganisms, such as cells, bacteria, etc., in particular mammalian cells, preferably under the constant supply of nutrients, thereby mimicking in vivo conditions. Such a method can be advantageously be executed using the presently disclosed centrifugal microfluidic disc and the presently disclosed mobile (i.e. portable) centrifugal microfluidic device. One embodiment relates to a method for monitoring cells, such as bacterial cells or mammalian cells, comprising the step of inoculating the cells in a culture chamber in a rotatable platform, such as the presently disclosed centrifugal microfluidic disc, the cells may be in a liquid solution comprising nutrients, rotating the platform such that liquid in a reservoir connected to or located on the platform, the liquid comprising nutrients for the cells, is constantly supplied to the culture chamber by means of shear/centrifugal force resulting from rotating the platform, the platform preferably rotating at a constant rotation rate. The effluent from the culture chamber can be transported to an outlet reservoir, e.g. by means of an effluent channel. These may also be located on the platform as herein described.

The rotation rate is preferably less than 10 Hz, more preferably less than 5 Hz, even more preferably less than 2 Hz, most preferably around 1 Hz. The liquid flow rate through the culture chamber is preferably constant by means of constant rotation of the platform. The liquid flow rate may be between 5 nL/min and 10 µL/min, preferably less than 5 µL/min, more preferably less than 2 µL/min, even more preferably less than 1 µL/min, most preferably less than 0.5 µL/min. Such conditions of low rotation rate and constant supply of nutrients can ensure that the cells can be monitored under mimicked in-vivo conditions for at least 6 hours, more preferably at least 12 hours, even more preferably at least 24 hours, most preferably at least 48, and even more than 96 hours.

Several groups and/or types of microorganisms can be monitored simultaneously, for example by having several culture chambers on the same disc and/or by having multiple discs mounted on top of each and rotated by the same platform. The cells can be monitored by imaging, electrochemical, electrical, etc., e.g. by means of suitable devices mounted on the rotating platform. Rotation of the platform and/or monitoring of the cells by means of imaging, electrochemical, electrical, etc., can be provided by means of the presently disclosed portable LoD device.

Examples

FIG. 7 shows a schematic illustration of an example of the presently disclosed powered lab-on-a-disc (PLoD) device: A miniaturized wireless optical microscope of the PLoD platform, which integrates a 2.4 GHz Wi-Fi transmitter, a complementary metal-oxide-semiconductor (CMOS, 1920× 1080 pixels) sensor, with a high numerical aperture optics and a wireless inductive "Qi" energy transmission interface. The motor is not show in FIG. 7. On the cell culture disc, cells are incubated in a cell culture chamber which is sealed by a lid layer. Cell clusters can be imaged by the CMOS sensor, while the real-time photo and video can be wirelessly displayed and stored on a smartphone or PC through the Wi-Fi transmitter. The Qi interface ensures stable power supply for the functioning of the wireless microscope for the full incubation period.

The wireless microscope imaging parameters such as resolution (1920×1080/1280×720), exposure time, modes switching (color/infrared) and photo/video capture time interval (from 15 minutes to 24 hours) can be controlled by a mobile application. Furthermore, four wireless microscopes can be monitored by the single mobile device or PC at the same time.

FIG. 9 is a photo of one example of integration of a spindle motor on a rotatable platform. The spindle motor is mounted with the drive shaft parallel to the axis of rotation of the platform but slightly displaced therefrom. The platform is in the form of a disk. A driving gear engaged with the drive shaft of the spindle motor and the rotation axis of the platform provides for transferal of the mechanical energy of the motor to rotation of the disk. Gearing is provided to better utilize the torque of the spindle motor, which for small motors are often quite small. Electronic components are also visible in FIG. 9 distributed all over the platform.

FIG. 10 shows a photo of a truly mobile example of the presently disclosed centrifugal microfluidic device with a motor integrated on the rotating platform, the motor is not visible. It is shown rotating in a grass field and is powered by a wireless mobile charger.

REFERENCES

[1] X. L. Xu, S. Zhang, H. Chen, and J. L. Kong, "Integration of electrochemistry in micro-total analysis systems for biochemical assays: Recent developments", Talanta, vol. 80 (2009), pp. 8-18.
[2] L. Nyholm, "Electrochemical techniques for lab-on-a-chip applications", Analyst, vol. 130 (2005), pp. 599-605.
[3] R. Burger, L. Amato, and A. Boisen, "Detection methods for centrifugal microfluidic platforms", Biosensors and Bioelectronics, vol. 76 (2016), pp. 54-67.
[4] X. Lu, P. Wang, D. Niyato, D.-K. Kim, Z Han, "Wireless charging technologies: fundamentals, standards, and network applications," *IEEE Communications Surveys & Tutorials,* 18, 1413-1452, 2015.

Further Details of the Invention

The present invention will now be explained in further detail with reference to the following enumerated item.
1. A mobile centrifugal microfluidic device for analysis of a fluid sample, comprising
   a supporting base for supporting the device on a surface,
   a rotatable platform on top of the base configured to rotate with respect to an axis perpendicular to the base,
   at least one sample chamber for holding a fluid sample, said sample chamber located on the rotatable platform and configured to rotate with the rotatable platform such that the fluid sample is centrifuged during rotation of the rotatable platform, and
   at least one motor integrated on the rotatable platform for rotating the platform and/or for generating electrical energy.
2. The mobile centrifugal microfluidic device according to item 1, wherein the motor is a spindle motor.
3. The mobile centrifugal microfluidic device according to any of the preceding items, wherein the motor is a brushless electrical motor.
4. The mobile centrifugal microfluidic device according to any of the preceding items, comprising a gearing mechanism integrated on the platform and engaged between a drive shaft of the motor and the axis of rotation of the platform.
5. The mobile centrifugal microfluidic device according to any of the preceding items, wherein the motor is mounted on the platform such that a drive shaft of the motor is parallel to but displaced from the axis of rotation of the platform.
6. The mobile centrifugal microfluidic device according to any of the preceding items, wherein the motor is mounted on the platform such that a drive shaft of the motor is coinciding with the axis of rotation of the platform.
7. The mobile centrifugal microfluidic device according to any of the preceding items, wherein the motor is mounted on the platform such that a drive shaft of the motor directly drives the rotation of the platform.
8. The mobile centrifugal microfluidic device according to any of the preceding items, comprising an energy storage device such as a capacitor or a battery, located on the platform and/or on the supporting base.
9. The mobile centrifugal microfluidic device according to any of the preceding items, comprising a handle engaged with the axis of rotation of the platform such that the platform can be manually rotated by rotation of the handle and wherein the motor is configured for generating electrical energy for powering the device during rotation of the platform.
10. The mobile centrifugal microfluidic device according to item 9, configured such that at least part of the generated electrical energy is stored in an energy storage device located on the platform.
11. The mobile centrifugal microfluidic device according to any of the preceding items, comprising a propeller unit for each motor such that each motor is configured for rotating a propeller unit for generating thrust, and wherein each motor is mounted on the platform such that the generated thrust can rotate the platform.
12. The mobile centrifugal microfluidic device according to item 11, comprising two or more motors, each motor having a propeller unit, and wherein the motors are mounted symmetric circumferentially on the platform for counterweight balancing.
13. The mobile centrifugal microfluidic device according to any proceeding items, comprising at least one wireless power system for powering the rotatable platform.
14. The mobile centrifugal microfluidic device according to any of the preceding items, comprising a wireless power receiver, preferably an inductive wireless power receiver, such as a Qi power receiver, integrated on the platform and configured for receiving energy for powering the rotatable platform through wireless power transmission.
15. The mobile centrifugal microfluidic device according to any of the preceding items, comprising a wireless power transmitter, preferably an inductive wireless power transmitter, such as a Qi power coil, integrated in or on the supporting base and configured for transmitting energy to the platform through wireless power transmission.

16. The mobile centrifugal microfluidic device according to any of the preceding items, comprising a wireless transmitter for wireless communication with an external communication device, the wireless transmitter preferably located on the platform.

17. The mobile centrifugal microfluidic device according to any of the preceding items, comprising a speed sensor, such as a Hall effect sensor, configured to monitor and control the rotational speed of the platform, the speed sensor preferably located on the platform.

18. The mobile centrifugal microfluidic device according to any of the preceding items, comprising a power regulator, preferably located on the platform.

19. The mobile centrifugal microfluidic device according to any of the preceding items, comprising a spinning display located on the rotatable platform and configured for displaying measurement parameters during rotation of the platform, measurement parameter such as progress of detection, input parameters, rotational speed and/or sensing results.

20. The mobile centrifugal microfluidic device according to item 19, wherein the spinning display is configured to be visible from the top of the platform and/or from the side of the platform.

21. The mobile centrifugal microfluidic device according to any of the preceding items, wherein the sample chamber is a microfluidic sample chamber which is visible from the top of the platform.

22. The mobile centrifugal microfluidic device according to any of the preceding items, configured for rotating the platform with a rotational speed of at least 5 RPM, more preferably at least 1000 RPM, most preferably at least 3000 RPM.

23. The mobile centrifugal microfluidic device according to any of the preceding items, comprising at least one light source, such as an LED, on the platform for illuminating the sample.

24. A mobile microfluidic system comprising the mobile centrifugal microfluidic device according to any of the preceding items and a software application executable on a remote device and configured for wirelessly communicating with the mobile centrifugal microfluidic device.

25. The mobile microfluidic system according to item 24, wherein the software application is configured to synchronize a camera on the remote device and optionally a light source on the remote device and/or on mobile centrifugal microfluidic device with the rotation of the platform for strobe photography of the sample during rotation of the platform.

26. The mobile microfluidic system according to items 24-25, wherein the software application is configured for receiving sensing results and/or for controlling and/or monitoring of the rotational speed of the platform.

27. A centrifugal microfluidic disc for in vitro studies of microorganisms or cells, the microfluidic disc comprising:
- an inlet reservoir comprising at least one opening, said opening preferably placed at the proximal end of the inlet reservoir;
- an outlet reservoir;
- at least one sample chamber for in vitro studies of microorganisms or cells, the sample chamber located between the inlet reservoir and the outlet reservoir;
- optionally an inoculation channel fluidly connected to the sample chamber, the channel comprising an opening at the proximal end of the channel, the channel being configured for placing an inoculum in the sample chamber;
- an inlet channel located between the inlet reservoir and the sample chamber; and
- an effluent channel located between the sample chamber and the outlet reservoir;
- wherein the inlet reservoir and the outlet reservoir are in fluid connection via the sample chamber, and wherein the microfluidic disc is configured for engaging with a rotatable platform or a motor for spinning the microfluidic disc.

28. The centrifugal microfluidic disc according to item 27, wherein the disc is a lab-on-a-disc.

29. The centrifugal microfluidic disc according to any of the preceding items, wherein any of the openings in the microfluidic disc are configured for engaging with either a) a syringe for introducing and/or removing a liquid through the opening or b) a filter for filtering air flowing into or out of the opening.

30. The centrifugal microfluidic disc according to any of the preceding items, wherein each of the one or more openings are closed with a filter.

31. The centrifugal microfluidic disc according to any of the preceding items, wherein the disc comprises multiple layers that are structurally fixed to form a single entity.

32. The centrifugal microfluidic disc according to any of the preceding items, wherein the disc is manufactured by stacking layers of poly(methyl methacrylate) (PMMA) and pressure-sensitive adhesive (PSA).

33. The centrifugal microfluidic disc according to any of the preceding items, wherein the materials of the disc are transparent such that the features of the disc are visible from the outside.

34. The centrifugal microfluidic disc according to any of the preceding items, wherein the sample chamber is visible from the outside such that a sample located inside the sample chamber may be imaged using a camera, an optical microscope, or a combination thereof.

35. The centrifugal microfluidic disc according to any of the preceding items, wherein the inlet reservoir is capable of holding approximately 3 mL of liquid.

36. The centrifugal microfluidic disc according to any of the preceding items, wherein the inlet reservoir is filled with a liquid.

37. The centrifugal microfluidic disc according to any of the preceding items, wherein the inlet reservoir is configured to enable a constant flow rate of a liquid flowing from the proximal end of the inlet reservoir to the distal end of the inlet reservoir, provided the microfluidic disc is rotated at a constant rotational speed.

38. The centrifugal microfluidic disc according to any of the preceding items, wherein the geometry of the inlet reservoir and/or the outlet reservoir resembles an arc of a circle, wherein the center of the circle is located at the center of the disc.

39. The centrifugal microfluidic disc according to any of the preceding items, wherein the inlet reservoir is located between the center of the disc and the outlet reservoir.

40. The centrifugal microfluidic disc according to any of the preceding items, wherein the outlet reservoir is located in close proximity to the periphery of the disc.

41. The centrifugal microfluidic disc according to any of the preceding items, wherein the inlet channel is connected to the inlet reservoir at the distal end of the inlet reservoir.

42. The centrifugal microfluidic disc according to any of the preceding items, wherein the inlet channel is connected to the proximal end of the sample chamber.

43. The centrifugal microfluidic disc according to any of the preceding items, wherein the inlet channel is configured for decreasing the flow rate of a liquid flowing from the inlet reservoir to the sample chamber.

44. The centrifugal microfluidic disc according to any of the preceding items, wherein the inlet channel is a serpentine channel that ensures a constant flow rate of a liquid flowing in the inlet channel.

45. The centrifugal microfluidic disc according to any of the preceding items, wherein the inoculation channel is a straight channel.

46. The centrifugal microfluidic disc according to any of the preceding items, wherein the inoculation channel is configured for receiving an injection needle through an opening at the proximal end of the channel.

47. The centrifugal microfluidic disc according to item 46, wherein the inoculation channel is configured such that the injection needle may extend from the proximal end of the channel and into the sample chamber for introducing a sample in the sample chamber.

48. The centrifugal microfluidic disc according to any of the preceding items, wherein the effluent channel is connected to the distal end of the sample chamber.

49. The centrifugal microfluidic disc according to any of the preceding items, wherein the effluent channel is connected to the proximal end of the outlet reservoir.

50. The centrifugal microfluidic disc according to any of the preceding items, wherein the effluent channel is configured to avoid clogging of the channel when a liquid flows from the sample chamber to the outlet reservoir.

51. The centrifugal microfluidic disc according to any of the preceding items, wherein the effluent channel is predominantly straight or slightly curved to avoid clogging of the channel.

52. The centrifugal microfluidic disc according to any of the preceding items, wherein the sample chamber is oval-shaped.

53. The centrifugal microfluidic disc according to any of the preceding items, wherein the sample chamber is capable of holding approximately 40 µL of liquid.

54. The centrifugal microfluidic disc according to any of the preceding items, wherein the sample chamber is suitable for studying a cell culture.

55. The centrifugal microfluidic disc according to item 5454, wherein the cell culture is selected among: animal cell culture, plant tissue culture, fungal culture, or microbiological culture.

56. The centrifugal microfluidic disc according to any of the preceding items, wherein the sample chamber is suitable for culturing mammalian cells.

57. The centrifugal microfluidic disc according to any of the preceding items, wherein the sample chamber is configured for visual inspection and/or imaging of a sample contained in the sample chamber.

58. The centrifugal microfluidic disc according to any of the preceding items, wherein the disc further comprises a transparent lid for covering the sample chamber.

59. The centrifugal microfluidic disc according to item 58, wherein the lid is suitable for growing a biofilm on the surface facing the sample chamber.

60. The centrifugal microfluidic disc according to any of the preceding items, wherein the disc comprises a plurality of sample chambers, each of said chambers being suitable for in vitro studies.

61. The centrifugal microfluidic disc according to item 60, wherein each of the sample chambers are located between the inlet reservoir and the outlet reservoir, and wherein each of the chambers establishes a fluid communication between the inlet reservoir and the outlet reservoir.

62. The centrifugal microfluidic disc according to any of items 60-61, wherein the plurality of sample chambers are connected to the same inlet channel.

63. The centrifugal microfluidic disc according to any of items 60-62, wherein the disc further comprises one inoculation channel per sample chamber, such that each sample chamber may be inoculated separately.

64. The centrifugal microfluidic disc according to any of the preceding items, wherein the disc is configured for stacking on top of other similar centrifugal microfluidic discs.

65. The centrifugal microfluidic disc according to any of the preceding items, wherein the disc further comprises a central hole for engaging with a rotatable disc or a motor for spinning the microfluidic disc.

66. The centrifugal microfluidic disc according to any of the preceding items, wherein the disc further comprises a microscope for imaging in vitro experiments in the sample chamber.

67. The centrifugal microfluidic disc according to any of the preceding items, wherein the disc is further configured for transmitting images wirelessly and in real-time to an electronic device.

68. The centrifugal microfluidic disc according to any of the preceding items, wherein the disc is further configured for engaging with a potentiostat configured for electrochemical measurements of a sample in the sample chamber.

69. The centrifugal microfluidic disc according to any of the preceding items, wherein the disc further comprises a potentiostat and/or an electrochemical analyser for performing electrochemical measurements of a sample in the sample chamber.

70. The centrifugal microfluidic disc according to any of the preceding items, wherein the disc further comprises a miniaturized Raman system for in-situ Raman mapping of a sample in the sample chamber.

71. A mobile centrifugal microfluidic device for in vitro studies of microorganisms or cells, the device comprising
a supporting base for supporting the device on a surface,
a rotatable platform on top of the base configured to rotate with respect to an axis perpendicular to the base,
at least one motor integrated on the rotatable platform for rotating the platform,
a centrifugal microfluidic disc according to item 27.

72. The mobile centrifugal microfluidic device according to item 71, further comprising an integrated microscope for acquiring images of a sample contained in the sample chamber.

73. The mobile centrifugal microfluidic device according to any of items 71-72, further comprising a potentiostat configured for electrochemical measurements of a sample in the sample chamber.

74. The mobile centrifugal microfluidic device according to any of items 71-73, further comprising a miniaturized Raman system for in-situ Raman mapping of a sample in the sample chamber.

The invention claimed is:

1. A centrifugal microfluidic disc comprising:
    an inlet reservoir;
    at least one inlet channel;
    at least one sample chamber for in vitro studies of microorganisms;
    an inoculation channel for placement of an inoculum in a sample chamber of the at least one sample chamber;
    at least one effluent channel; and
    an outlet reservoir;
wherein the microfluidic disc is configured for engaging with a rotatable platform or a motor for spinning the microfluidic disc, and wherein the disc is configured such that during rotation of the disc, liquid in the inlet reservoir will be centrifugally forced outwards such that liquid can be controllably transferred from the inlet reservoir to the outlet reservoir via 1) the inlet channel, 2) the sample chamber and 3) the effluent channel, wherein the geometry of the inlet reservoir and the outlet reservoir resembles an arc of a circle, wherein the center of the circle is located at the center of the disc.

2. The centrifugal microfluidic disc according to claim 1, wherein the inlet reservoir and/or the outlet reservoir is provided with an opening for transferring a liquid to or from the reservoir.

3. The centrifugal microfluidic disc according to claim 1, wherein the inlet channel between the inlet reservoir and the sample chamber(s) comprises at least one serpentine to increase mixing of nutrients located in a liquid flowing through the inlet channel.

4. The centrifugal microfluidic disc according to claim 1, wherein the volume of the inlet reservoir is at least 1, 3 mL or 5 mL.

5. The centrifugal microfluidic disc according to claim 1, wherein the volume of the sample chamber(s) is between 1 and 100 µL, or between 10 and 80 µL, or between 45 and 65 µL.

6. The centrifugal microfluidic disc according to claim 1, configured to have a constant liquid flow rate through the sample chamber of between 10 nL/min and 5 µL/min when the microfluidic disc is rotated with a constant frequency of less than 10 Hz.

7. The centrifugal microfluidic disc according to claim 1, wherein the disc is manufactured by stacking layers of polymer and adhesive.

8. The centrifugal microfluidic disc according to claim 1, wherein the inlet reservoir and/or the inlet channel is configured to enable a constant flow rate of liquid flowing from the inlet reservoir to the sample chamber, provided the microfluidic disc is rotated at a constant rotational speed.

9. The centrifugal microfluidic disc according to claim 1, wherein the a cross-sectional area of the inlet channel determines the flow rate of a liquid flowing from the inlet reservoir to the sample chamber at a giving rotational speed of the disc.

10. The centrifugal microfluidic disc according to claim 1, wherein the disc comprises a plurality of sample chambers.

11. The centrifugal microfluidic disc according to claim 10, wherein a single inlet channel connects the plurality of sample chambers to the inlet reservoir.

12. A portable centrifugal microfluidic device configured for in vitro studies of microorganisms, the device comprising
    a supporting base for supporting the device on a surface,
    a rotatable platform on top of the base configured to rotate with respect to an axis perpendicular to the base,
    at least one motor integrated on the rotatable platform for rotating the platform, and
    a centrifugal microfluidic disc according to claim 1.

13. A method for monitoring microorganisms under the influence of liquid flow, the method comprising the steps of:
    inoculating the microorganisms in a sample chamber located on a centrifugal microfluidic disc comprising:
        an inlet reservoir;
        at least one inlet channel;
        at least one sample chamber for in vitro studies of microorganisms;
        at least one effluent channel; and
        an outlet reservoir;
    wherein the microfluidic disc is configured for engaging with a rotatable platform or a motor for spinning the microfluidic disc, and wherein the disc is configured such that during rotation of the disc, liquid in the inlet reservoir will be centrifugally forced outwards such that liquid can be controllably transferred from the inlet reservoir to the outlet reservoir via 1) the inlet channel, 2) the sample chamber and 3) the effluent channel, wherein the geometry of the inlet reservoir and the outlet reservoir resembles an arc of a circle, wherein the center of the circle is located at the center of the disc;
    filling the inlet reservoir of the microfluidic disc with a liquid comprising nutrients for the microorganisms;
    rotating the microfluidic disc whereby the liquid in the inlet reservoir is forced out of the reservoir by centrifugal forces and into the sample chamber such that a liquid flow is present in the sample chamber during rotation;
    monitoring the microorganisms during rotation of the microfluidic disc by means a monitoring system.

14. The method of claim 13, wherein the monitoring includes optical imaging, electrochemical measurements, or Raman spectroscopy.

15. The method of claim 13, wherein the microorganisms are cells and wherein the cells are monitored during growth of the cells.

16. The method of claim 13, wherein the microorganisms are bacteria.

17. The method of claim 13, wherein the microorganisms are mammalian cells.

18. The method of claim 13, comprising the step of performing Raman mapping of the microorganisms during rotation of the centrifugal microfluidic disc.

19. A centrifugal microfluidic disc comprising:
    an inlet reservoir;
    at least one inlet channel;
    a plurality of sample chambers for in vitro studies of microorganisms;
    one inoculation channel per sample chamber, such that each sample chamber may be inoculated separately;
    at least one effluent channel; and
    an outlet reservoir;

wherein the microfluidic disc is configured for engaging with a rotatable platform or a motor for spinning the microfluidic disc, and wherein the disc is configured such that during rotation of the disc, liquid in the inlet reservoir will be centrifugally forced outwards such that liquid can be controllably transferred from the inlet reservoir to the outlet reservoir via 1) the inlet channel, 2) the plurality of sample chambers and 3) the effluent channel, wherein the geometry of the inlet reservoir and the outlet reservoir resembles an arc of a circle, wherein the center of the circle is located at the center of the disc.

20. A centrifugal microfluidic disc comprising:
    an inlet reservoir;
    at least one inlet channel;
    a plurality of sample chambers for in vitro studies of microorganisms, wherein a single inlet channel connects the plurality of sample chambers to the inlet reservoir;
    at least one effluent channel; and
    an outlet reservoir;
wherein the microfluidic disc is configured for engaging with a rotatable platform or a motor for spinning the microfluidic disc, and wherein the disc is configured such that during rotation of the disc, liquid in the inlet reservoir will be centrifugally forced outwards such that liquid can be controllably transferred from the inlet reservoir to the outlet reservoir via 1) the inlet channel, 2) the plurality of sample chambers and 3) the effluent channel, wherein the geometry of the inlet reservoir and the outlet reservoir resembles an arc of a circle, wherein the center of the circle is located at the center of the disc.

* * * * *